(12) United States Patent
Sugishita et al.

(10) Patent No.: US 7,831,657 B2
(45) Date of Patent: Nov. 9, 2010

(54) ELECTRONIC APPARATUS FOR IDENTIFYING AND UTILIZING EXTERNAL APPLICATIONS CONTAINED ON EXTERNAL APPARATUSES

(75) Inventors: Satoru Sugishita, Tokyo (JP); Masahiro Suzuki, Tokyo (JP); Yoko Sugiura, Kanagawa (JP); Hiroshi Baba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1456 days.

(21) Appl. No.: 11/224,971

(22) Filed: Sep. 14, 2005

(65) Prior Publication Data

US 2006/0064297 A1 Mar. 23, 2006

(30) Foreign Application Priority Data

Sep. 17, 2004 (JP) ............................. 2004-272225
Sep. 1, 2005 (JP) ............................. 2005-253027

(51) Int. Cl.
*G06F 13/00* (2006.01)
(52) U.S. Cl. .................................................... 709/203
(58) Field of Classification Search ................. 709/203; 719/330
See application file for complete search history.

(56) References Cited

U.S. PATENT DOCUMENTS 6,067,580 A * 5/2000 Aman et al. ................. 719/330

FOREIGN PATENT DOCUMENTS

| JP | 2001-309094 | 11/2001 |
| JP | 2002-84383 | 3/2002 |
| JP | 2003-173115 | 6/2003 |
| JP | 2004-34506 | 2/2004 |
| JP | 2004-82701 | 3/2004 |
| JP | 2005-49952 | 2/2005 |

OTHER PUBLICATIONS

U.S. Appl. No. 10/579,388, filed May 15, 2006, Suzuki, et al.
U.S. Appl. No. 11/500,955, filed Aug. 9, 2006, Sugishita.
U.S. Appl. No. 11/828,051, filed Jul. 25, 2007, Sugishita.

* cited by examiner

*Primary Examiner*—Robert B Harrell
(74) *Attorney, Agent, or Firm*—Oblon, Spivak, McClelland, Maier & Neustadt, L.L.P.

(57) ABSTRACT

An electronic apparatus for performing an operation by use of an application, which can communicate with a plurality of external apparatuses, includes an application registering unit to register one or more applications selected as available applications from applications installed in the plurality of external apparatuses, an application selecting unit to select an application to be utilized from the one or more applications registered by the application registering unit, and a control unit to communicate with an external apparatus having the selected application installed therein to perform the operation by utilizing the selected application installed in the external apparatus.

38 Claims, 31 Drawing Sheets

EXAMPLE OF ERROR SCREEN

THIS FUNCTION IS
NOT AVAILABLE NOW.

CAUSE OF ERROR:
SERVER UNAVAILABLE

FIG.14

EXAMPLE OF APPLICATION SELECTING SCREEN

PLEASE SELECT TYPE OF APPLICATION
YOU WISH TO USE

APPLICATION 1: COPY: VERSION 1.03
APPLICATION 2: COPY: VERSION 2.01

APPLICATION 3: SCANNER: VERSION 1.05
APPLICATION 4: SCANNER: VERSION 1.08

ADMINISTRATOR FUNCTION
GENERAL FUNCTION

NORMAL COPY FUNCTION
PROGRAMMED COPY FUNCTION
INTERRUPTION COPY FUNCTION

COPY FUNCTION
PRINTER FUNCTION
SCANNER FUNCTION
FAX FUNCTION

HIGH SECURITY FUNCTION
STANDARD SECURITY FUNCTION
LOW SECURITY FUNCTION

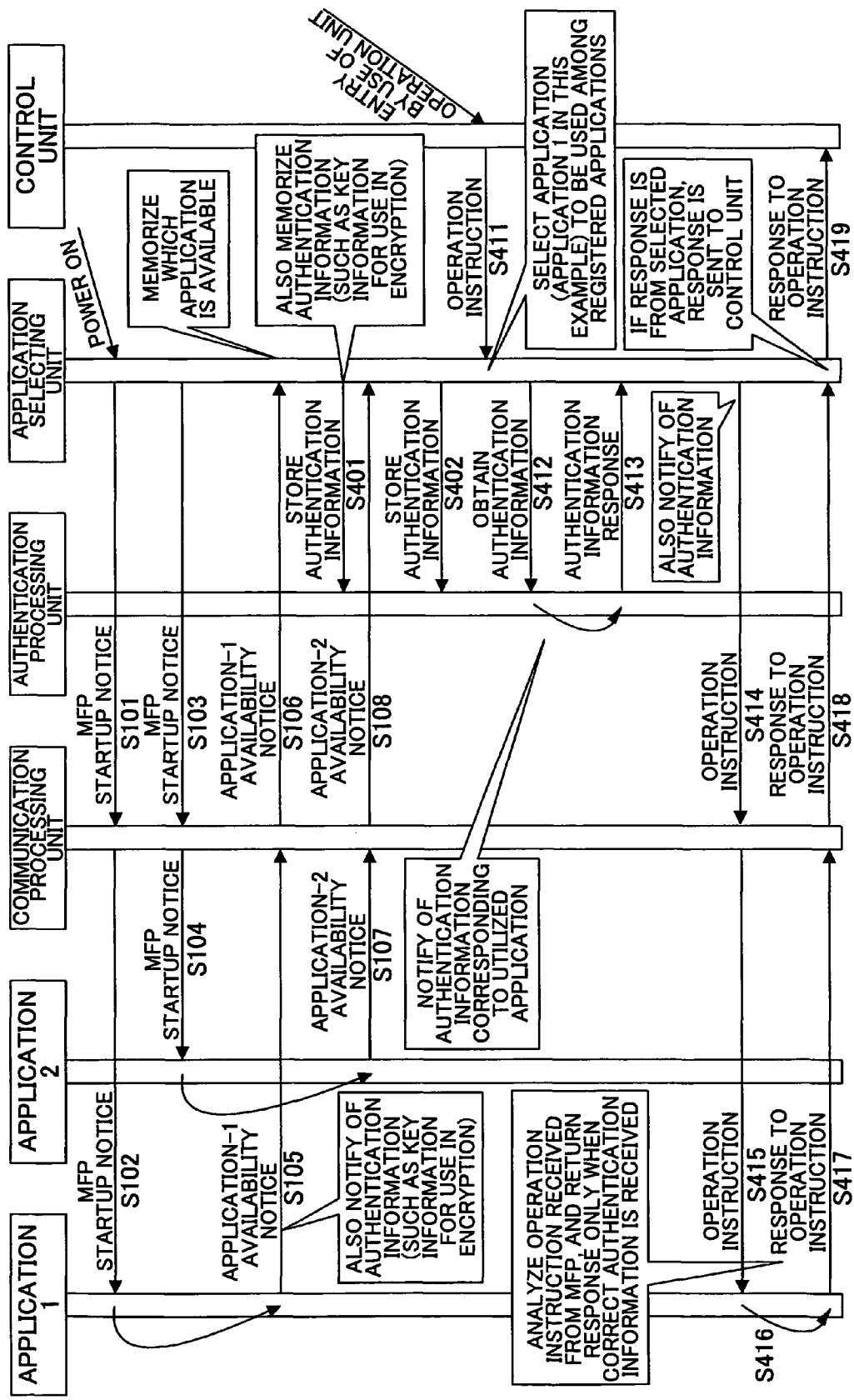

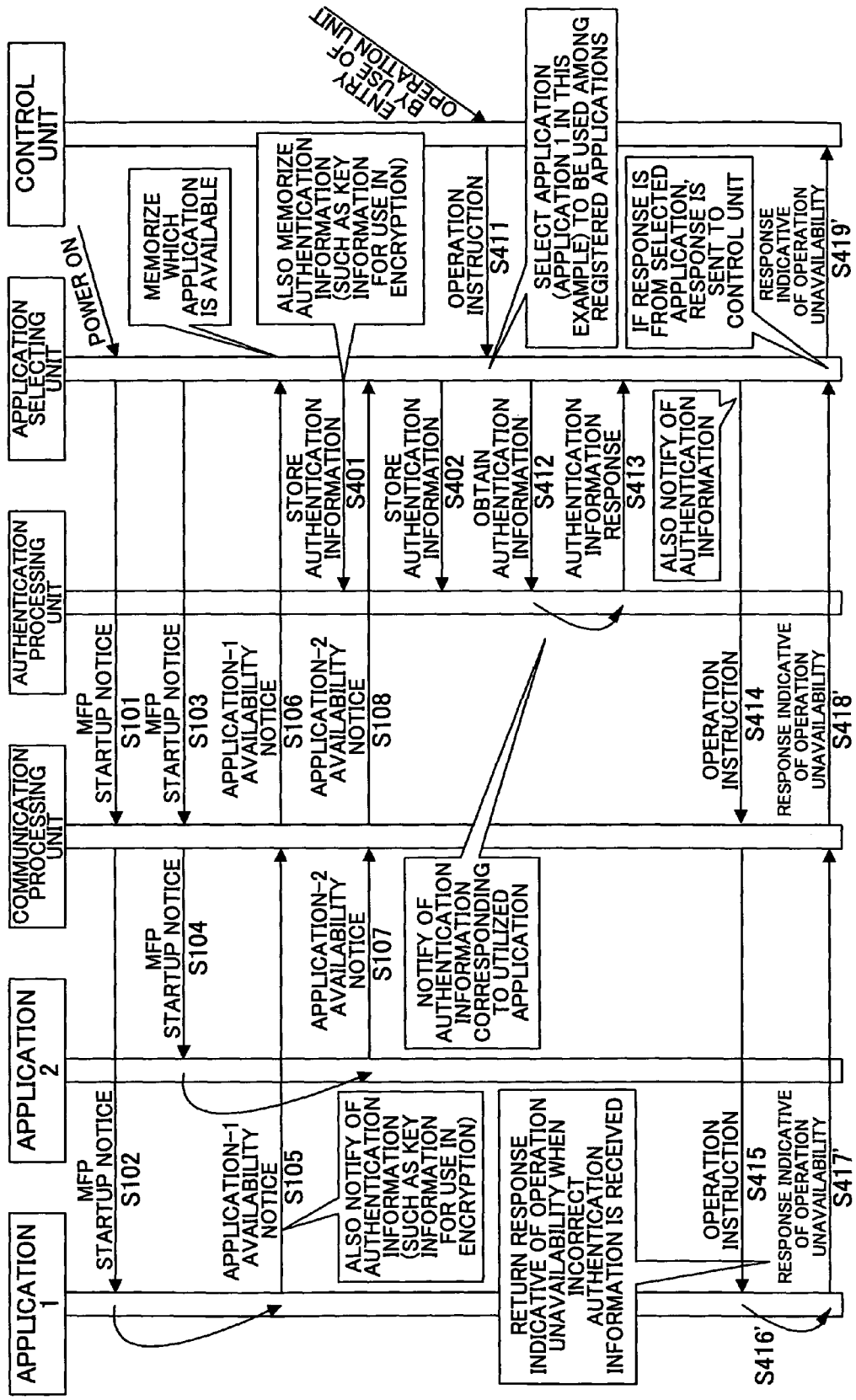

ELECTRONIC APPARATUS FOR IDENTIFYING AND UTILIZING EXTERNAL APPLICATIONS CONTAINED ON EXTERNAL APPARATUSES

BACKGROUND OF THE INVENTION

1. Field of the Invention

The present invention relates to electronic apparatus such as image processing apparatus (e.g., image scanning apparatus such as a scanner, and image forming apparatus such as digital copier apparatus, printer, facsimile apparatus, digital multifunction peripherals, etc.), an electronic apparatus system comprised of such electronic apparatus and external apparatus coupled thereto via a communication channel, a method of controlling the electronic apparatus, a program to be executed by the computer of the electronic apparatus, and a computer-readable record medium having the program recorded therein.

2. Description of the Related Art

In recent years, multifunctional image forming apparatuses such as digital multifunction peripherals have been commonly used by a large number of users, providing a free choice of functions selectable from the copier function, printer function, scanner function, facsimile function, etc. Such image forming apparatuses are implemented by combining an image forming unit (plotter unit), an image scanning unit (scanner unit), a facsimile communication unit, an image processing unit (controller), etc.

Such multifunctional image forming apparatuses are generally implemented as a copier-based apparatus. The functions of the apparatus may be partially utilized to allow the apparatus to be used as a printer or scanner, and a facsimile communication unit may be added to allow the apparatus to be used as a facsimile device.

In order to allow each function to be freely selected and performed, these functions need to be provided with respective application programs (hereinafter sometimes simply referred to as "application") for implementing the functions. Conventionally, a single image forming apparatus is provided with all the applications (Japanese Patent Application Publication No. 2002-84383).

The term "application" refers to application software or an application program. Such application constitutes a user interface to implement the function to be provided to users, and include a copy application for implementing the copy function, a printer application for implementing the printer function, a scanner application for implementing the scanner function, a facsimile application for implementing the facsimile (FAX) function, etc.

The provision of all the applications for implementing desired functions in a multifunctional image forming apparatus results in a cost increase. Further, the larger the number of the applications, the larger the number of maintenance works performed by service personnel for version updating of the applications.

Accordingly, there is a need for a scheme for reducing costs associated with the provision of multiple functions in an electronic apparatus such as an image forming apparatus and for reducing the amount of labor necessary for version updates.

SUMMARY OF THE INVENTION

It is a general object of the present invention to provide an electronic apparatus and electronic apparatus system that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by electronic apparatus and electronic apparatus system particularly pointed out in the specification in such full, clear, concise, and exact terms as to enable a person having ordinary skill in the art to practice the invention.

To achieve these and other advantages in accordance with the purpose of the invention, the invention provides an electronic apparatus for performing an operation by use of an application, which can communicate with a plurality of external apparatuses. The electronic apparatus includes an application registering unit to register one or more applications selected as available applications from applications installed in the plurality of external apparatuses, an application selecting unit to select an application to be utilized from the one or more applications registered by the application registering unit, and a control unit to communicate with an external apparatus having the selected application installed therein to perform the operation by utilizing the selected application installed in the external apparatus.

According to another aspect of the present invention, an electronic apparatus system is provided, in which an electronic apparatus for performing an operation by use of an application and a plurality of external apparatuses are connected together via a communication link, at least one of the external apparatuses serving as an application server, another one of the external apparatuses serving as an application management server. The electronic apparatus system includes an application storing unit provided in the application server to store an application therein, a controlling unit provided in the application server to analyze contents of an operation instruction by use of the application stored in the application storing unit upon receiving the operation instruction from the electronic apparatus, and to transmit a request for execution of a corresponding operation to the electronic apparatus as a response to the operation instruction, an application managing unit provided in the application management server to manage a plurality of applications, an application registering unit provided in the application management server to register one or more applications installed in the external apparatuses as available applications according to management status of the application managing unit, an application information transmitting unit provided in the application management server to transmit information indicative of the one or more applications registered by the application registering unit to the electronic apparatus, an application registering unit provided in the electronic apparatus to register one or more available applications based on the information transmitted from the application information transmitting unit of the application management server, an application selecting unit provided in the electronic apparatus to select an application to be utilized from the one or more available applications registered by the application registering unit, and a control unit provided in the electronic apparatus to transmit an operation instruction to one of the external apparatuses having the application selected by the application selecting unit installed therein in response to an entry of the operation instruction, and to perform the operation requested by a request for execution of the operation upon receiving the request as a response to the transmitted operation instruction.

According to another aspect of the present invention, an electronic apparatus system is provided, in which an electronic apparatus for performing an operation by use of an application and a plurality of external apparatuses are connected together via a communication link, at least one of the external apparatuses serving as an application server, another one of the external apparatuses serving as an application management server. The electronic apparatus system includes an application storing unit provided in the application server to store an application therein, a controlling unit provided in the application server to analyze contents of an operation instruction by use of the application stored in the application storing unit upon receiving the operation instruction from the electronic apparatus, and to transmit a request for execution of a corresponding operation to the electronic apparatus as a response to the operation instruction, an application managing unit provided in the application management server to manage a plurality of applications, an application registering unit provided in the application management server to register one or more applications installed in the external apparatuses as available applications according to management status of the application managing unit, an application selecting unit provided in the application management server to select an application to be utilized from the one or more applications registered by the application registering unit, an application information transmitting unit provided in the application management server to transmit information indicative of the utilized application selected by the application selecting unit to the electronic apparatus, an application registering unit provided in the electronic apparatus to register the utilized application based on the information transmitted from the application information transmitting unit of the application management server, and a control unit provided in the electronic apparatus to transmit an operation instruction to one of the external apparatuses having the utilized application registered by the application registering unit installed therein in response to an entry of the operation instruction, and to perform the operation requested by a request for execution of the operation upon receiving the request as a response to the transmitted operation instruction.

According to another aspect of the present invention, a method of controlling an electronic apparatus that performs an operation by use of an application includes a registering step of registering one or more applications selected as available applications from applications installed in a plurality of external apparatuses to which the electronic apparatus is connected through a communication link, a selecting step of selecting an application to be utilized from the one or more applications registered by the registering step, and a communicating step of communicating with an external apparatus having the selected application installed therein to perform the operation by utilizing the selected application installed in the external apparatus.

According to another aspect of the present invention, a machine-readable medium having a program embodied therein for causing a computer of an electronic apparatus to perform an operation by use of an application is provided, wherein the electronic apparatus communicates with a plurality of external apparatuses. The program includes an application registering function unit to register one or more applications selected as available applications from applications installed in the plurality of external apparatuses, an application selecting function unit to select an application to be utilized from the one or more applications registered by the application registering function unit, and a control function unit to communicate with an external apparatus having the selected application installed therein to perform the operation by utilizing the selected application installed in the external apparatus.

According to at least one embodiment of the present invention, a plurality of electronic apparatuses can share applications, so that each electronic apparatus can utilize a plurality of functions at low cost. Further, this reduces the amount of labor necessary for the version update of the applications.

BRIEF DESCRIPTION OF THE DRAWINGS

Other objects and further features of the present invention will be apparent from the following detailed description when read in conjunction with the accompanying drawings, in which:

FIG. 4 is a drawing showing an example of an operation screen displayed on an LCD touch panel;

FIG. 5 is a drawing showing another example of the operation screen displayed on the LCD touch panel;

FIG. 12 is a drawing showing an example of an error screen;

FIG. 14 is a drawing showing an example of an application selecting screen;

FIG. 31 is a drawing showing a first example of the communication sequence between the external applications and the MFP at the time of startup of the MFP shown in FIG. 30; and FIG. 32 is a drawing showing a second example of the communication sequence between the external applications and the MFP at the time of startup of the MFP shown in FIG. 30.

DESCRIPTION OF THE PREFERRED EMBODIMENTS

In the following, embodiments of the present invention will be described with reference to the accompanying drawings.

First, a description will be given of an image forming system that is a first embodiment of an electronic apparatus system according to the present invention.

Figure 1:
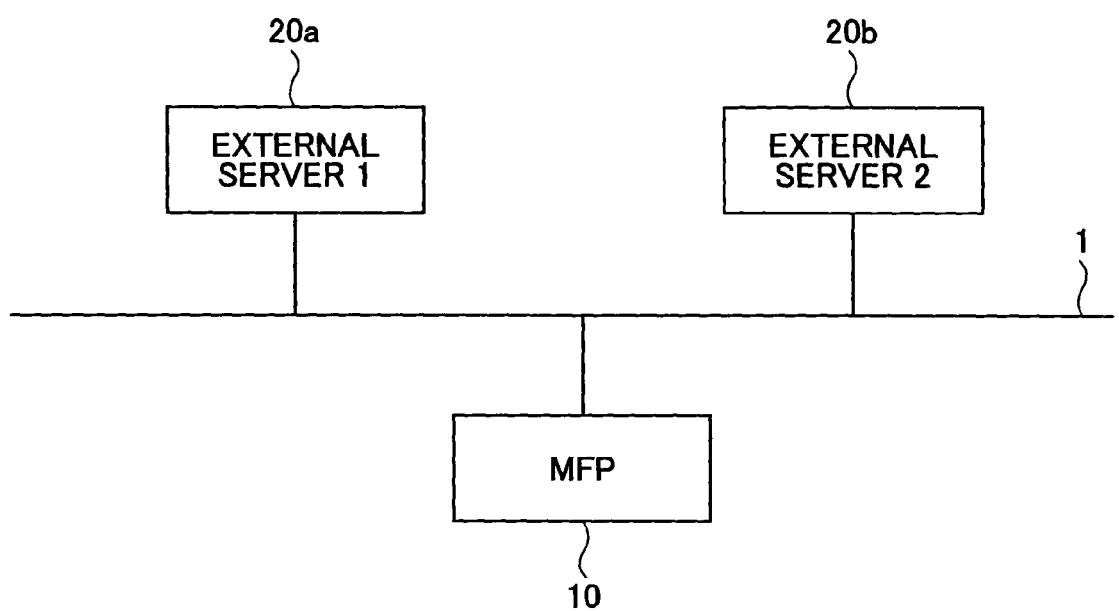
FIG. 1 is a schematic diagram showing an example of network connection of an image forming system.

FIG. 1 is a schematic diagram showing an example of network connection of the image forming system. For the sake of convenience of illustration, only one digital multifunction peripheral (hereinafter sometimes referred to as "MFP") is illustrated.

In this image forming system, a plurality of MFPs 10 (may as well be other image processing apparatuses) serving as electronic apparatuses and a plurality of external severs 20 (20a, 20b, and so on) serving as external apparatuses (application servers) are connected to conduct communication with each other via a network 1 such as a LAM (local area network). It should be noted that the MFPs 10 and the external servers 20 can communicate with each other in one-to-many relationship via the network 1. If the MFPs 10 and the external servers 20 are coupled via communication links such as USB or IEEE1394, the MFPs 10 and the external servers 20 can communicate with each other in one-to-one relationship.

In the following, an example of the hardware configuration of the MFP 10 will be described with reference to FIG. 2.

Figure 2:
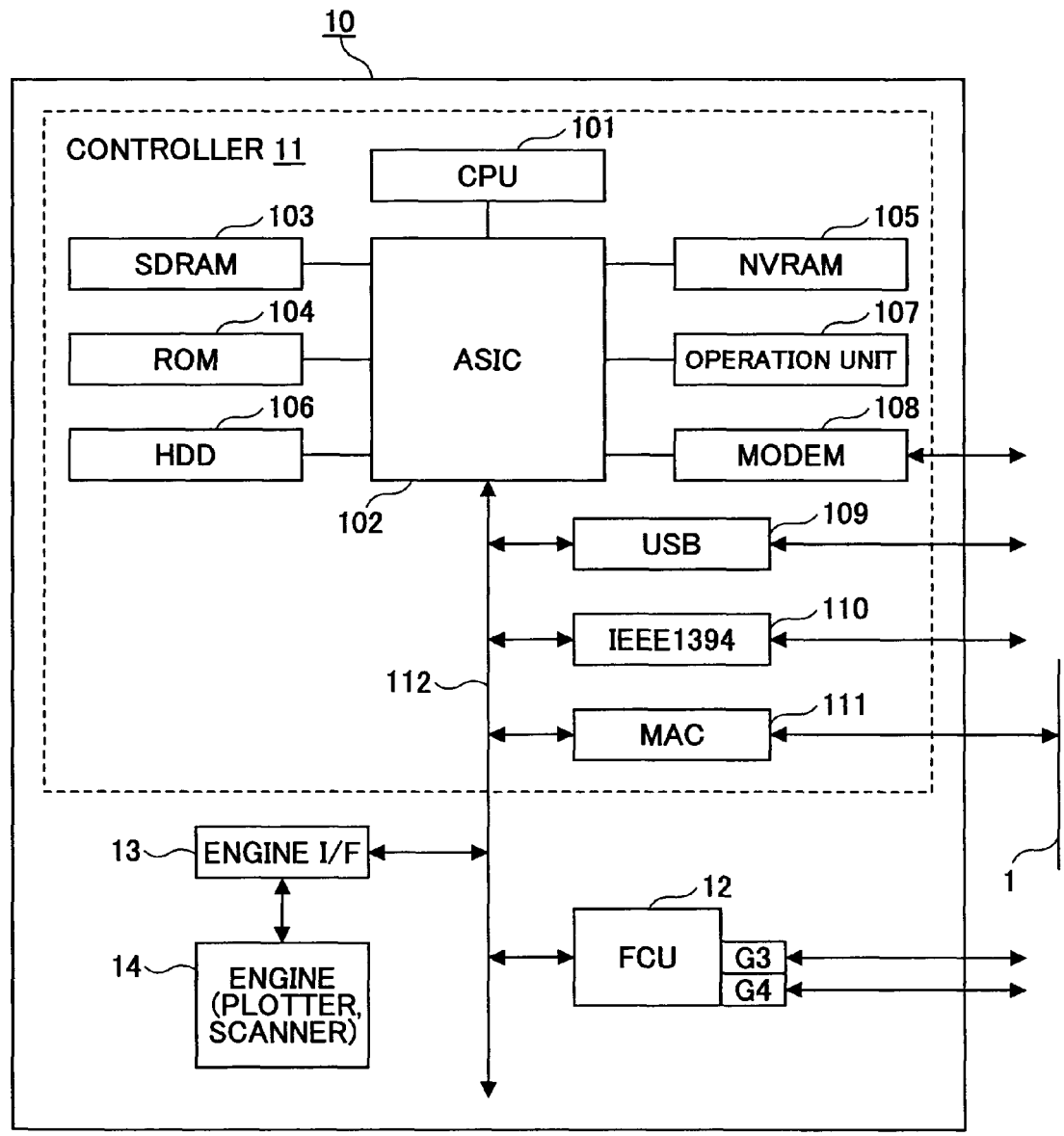
FIG. 2 is a block diagram showing an example of the hardware configuration of an MFP.

FIG. 2 is a block diagram showing an example of the hardware configuration of the MFP 10.

This MFP 10 is an image forming apparatus that can implement various functions inclusive of the functions of a digital copier, a printer, a facsimile apparatus, a scanner apparatus, i.e., the copy function, the printer function, the facsimile function, and the scanner function. As shown in FIG. 2, the MFP 10 includes a controller 11, a FCU (fax control unit) 12, an engine interface (the term "interface" may hereinafter be referred to as "I/F") 13, an engine 14, etc. This configuration constitutes hardware resources for performing image processing such as the scanning of a copy image, the printing of an image (forming of an image), the transmission of image data, etc.

The controller 11 utilizes each application which will be later described (receives a request to perform an action in response to an operation instruction to each application), and performs the overall control of individual parts of the MFP 10. Such control achieves the respective functions.

The FCU 12 controls communication with an external apparatus via a public line. The external apparatus may be an image forming apparatus such as a digital copier equipped with a FAX apparatus or a modem function (FAX communication function), another MFP (digital multifunction peripheral), or the like.

The engine I/F 13 is an interface for connecting the engine 14 to the PCI (Peripheral Component Interconnect) bus.

The engine 14 is a hardware device that may be a scanner (image scanning means) for scanning a copy image, a plotter (image forming means) for forming (printing) an image on a record medium such as a paper sheet in response to image data scanned by the scanner or data received from an external apparatus, an auto-document feeder for feeding a copy automatically to the position where the scanner scans an image, a finisher for performing finishing work such as sorting, punching, and stapling of paper sheets on which images are formed by the plotter, etc.

The controller 11 includes a CPU 101, an ASIC (Application Specific Integrated Circuit) 102, an SDRAM 103, a ROM 104, an NVRAM 105, an HDD (hard-disk drive) 106, an operation unit 107, a modem 108, a USB (Universal Serial Bus) I/F 109, an IEEE (Institute of Electrical and Electronic Engineers) 1394 I/F 110, and MAC (Media Access Controller) I/F 111. In reality, the operation unit 107 is situated outside the controller 11.

The CPU 101 is a computing unit for performing data processing (controlling each function) via the ASIC 102.

The ASIC 102 is a multifunctional device board comprised of a CPU interface, an SDRAM interface, a local bus interface, a PCI interface, an HDD interface, etc. The ASIC 102 serves to facilitate the sharing of devices to be controlled by the CPU 101, thereby assisting to improve efficiency in the development of applications from the architecture side.

The ASIC 102 is directly connected to the operation unit 107 for receiving operation instructions directed to the engine 14, and is also directly connected to the modem 108. Further, the ASIC 102 is coupled to the USB I/F 109, the IEEE1394 I/F 110, the MAC I/F 111, the FCU 12, and the engine I/F 13 via the PCI bus 112.

The SDRAM 103 is a main memory that serves as a program memory for storing various programs, a work memory for use by the CPU 101 at the time of data processing, etc. It should be noted that a DRAM or SRAM may alternatively used in place of the SDRAM 103.

The ROM 104 is a memory that permanently stores fixed data and programs executed by the CPU 101. The ROM 104 may be used to store various applications (internal applications).

The NVRAM 105 is a nonvolatile memory for storing data such as modifiable various parameters. The NVRAM 105 can retain its stored contents even after the power is turned off. As the NVRAM 105, a nonvolatile RAM implemented as an integrated backup circuit based on the use of a RAM and a buttery or a nonvolatile memory such as an EEPROM or a flash memory may be used.

The HDD 106 is a storage device (record medium) for storing and retaining data regardless of the on/off of the power. Data stored in the SDRAM 103 or data stored in the NVRAM 105 may be stored in the HDD 106.

Figure 3:
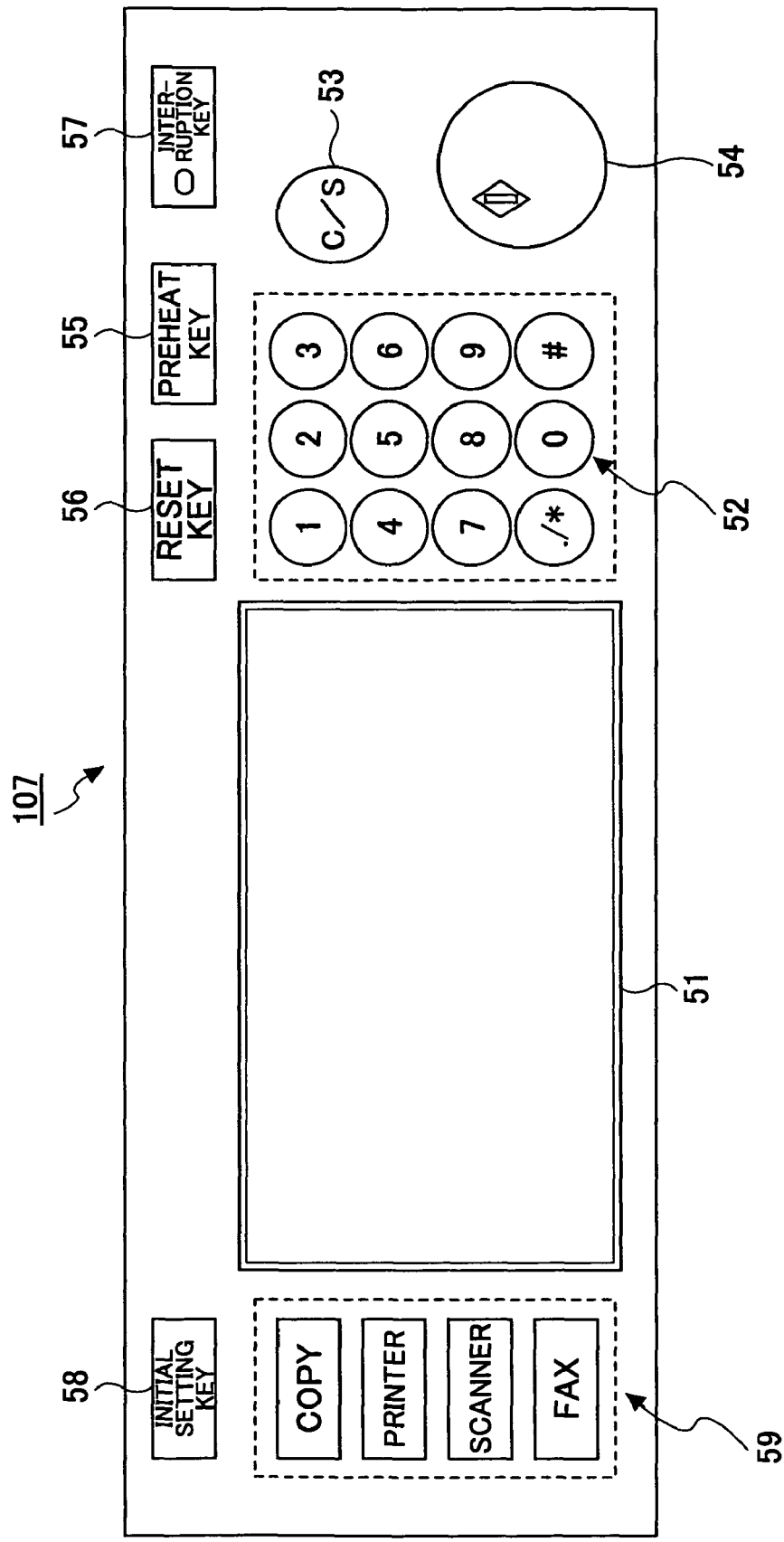
FIG. 3 is a drawing showing an example of the operation unit.

The operation unit 107 includes various operation keys (also referred to as operation switches or operation buttons) for entering data indicative of operation instruction directed to the engine 14 or the external servers 20, and also includes a character displaying unit such as an LCD or CRT. FIG. 3 shows an example of the operation unit 107.

The modem 108 is a modulation/demodulation unit, which modulates data into a signal that can be carried over a public line when transmitting the data to an external apparatus (not shown) via the public line. Further, the modem 108 demodulates modulated data when receiving the modulated data transmitted from the external apparatus.

The USB I/F 109 and the IEEE1394 I/F 110 are interfaces (direct interfaces) complying to the USB standard and the IEEE1394 standard, respectively. These interfaces are used to establish a direct connection for communication with an external apparatus (peripheral apparatus).

The MAC I/F 111 is a network interface for conducting communication with external apparatuses such as the external servers 20 via the network 1 such as a LAN.

It should be noted that an other direct interface in addition to the USB I/F 109 and the IEEE1394 I/F 110 may be added to the controller 11.

In the following, the operation unit 107 of the MFP 10 will be described with reference to FIG. 3.

FIG. 3 is a layout diagram showing an example of the configuration of the operation unit 107.

The operation unit 107 includes an LCD touch panel 51, a key pad 52, a clear/stop key 53, a start key (print key) 54, a preheat key 55, a reset key 56, an interruption key 57, an initial setting key 58, and a function switching key 59.

The LCD touch panel 51 is provided with a touch panel on the surface of the LCD display. The LCD touch panel 51 can display function keys, the number of copies, a message indicative of the status of the machine, etc.

The key pad 52 is used to enter the number of prints (the number of copies), a value indicative of a magnification factor, etc.

The clear/stop key 53 is used to clear the number (the number of prints), to stop the ongoing operation (scan operation or print operation), etc.

The MFP 10 equipped with the operation unit 107 enters an interruption mode upon the pressing of the interruption key 57. The interruption mode is used to interrupt a copy operation temporarily when this copy operation (copy job) is underway or in the process of being set after starting in response to the pressing of the start key 54 (operation instruction).

When the interruption key 57 is pressed, the copy mode preceding the pressing of the key or status information on the ongoing copy operation if the pressing occurs halfway through a copy operation is written to the NVRAM 105 or the HDD 106 for storage therein. Thereafter, entry into the interruption mode is performed to initialize the copy mode.

The start key 54 is then pressed to start an interrupting copy operation. After this copy operation is completed, the interruption key 57 is pressed to release the interruption mode, followed by retrieving the copy mode or the status information on the ongoing copy operation from the NVRAM 105 or the HDD 106, and then reverting to the original status prior to the entry into the interruption mode. The start key 54 is then pressed to resume the copy operation in the copy mode that was effective prior to the interruption.

The pressing of the initial setting key 58 allows the initial states of the machine to be customized as desired.

For example, the size of the transfer sheets (paper sheets) contained in the machine may be specified. The initial states that come about in response to the pressing of the preheat key 55 (when used as a mode clear key for clearing the copy mode) may also be specified as desired.

Further, an application that is selected as a first choice in response to the absence of key operation for a predetermined time period may be specified. Also, the time period before entering a low power consumption mode according to the international ENERGY STAR program and the time period before entering the auto-off/sleep mode may as well be specified.

When the preheat key 55 is pressed for more than about one second, the machine shifts from the standby state to the preheat state. This initiates actions such as lowering the surface temperature (fusing temperature) of the fuser rollers provided in the fuser unit (not shown) and turning off the display of the operation unit 107.

The term "preheat state" refers to the low power consumption state defined in the international ENERGY STAR program.

When it is desired to exit from the preheat state or the turned-off/sleep state to enter the standby state, the preheat key 55 needs to be pressed again.

The function switching key 59 is used to switch between the copy function, printer function, scanner function, and FAX function.

The copy function serves to scan a copy image by use of the scanner, to send the image data to the plotter, and to print (form) a visible image on a record medium such as a paper sheet.

The printer function serves to send image data supplied from an external apparatus to the plotter after some data processing or without any data processing, and to perform a printer operation that prints a visible image on a record medium.

The scanner function serves to perform a scanner operation that scans a copy image by use of the scanner, and writes the scanned image data to the memory (SDRAM 103, NVRAM 105, or HDD 106) for storage therein.

After the scanner operation, the start key 54 may be pressed to retrieve (read) the image data from the SDRAM 103 or the HDD 106. An image may then be printed on a transfer sheet based on the image data.

The FAX function serves to perform a FAX transmission operation that scans a copy image by use of the scanner, and transmits the scanned image data to an external apparatus via the FCU 12. The FAX function also serves to perform a FAX reception operation that receives image data from an external apparatus via the FCU 12, and supplies the image data to the plotter to form an image on a record medium.

Figures 4, 5:
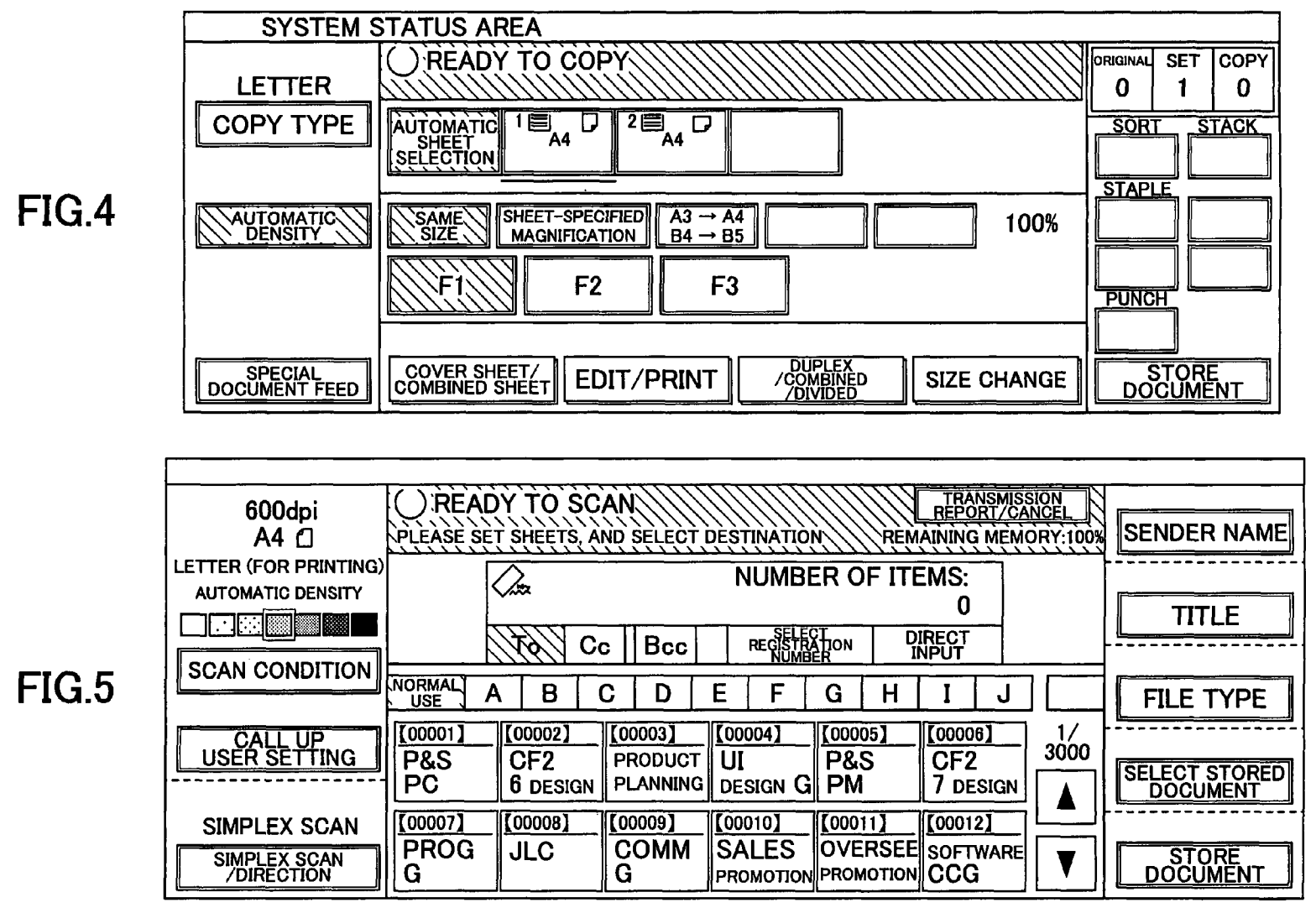

FIG. 4 and FIG. 5 are drawings showing other examples of the operation screen displayed on the LCD touch panel 51.

As the operator (user) touches a function key shown on the screen of the LCD touch panel 51, the function (mode) indicated inside the frame of this function key is selected, resulting in the reversal of black/white colors.

It may be desired to specify the detail of the function (e.g., a magnification factor in the case of magnification). In such a case, the function key may be touched to pop up a setting operation screen for setting the detail of the function.

The LCD touch panel 51 may be implemented as a dot-based display, which makes it possible to present information suitable to the needs by way of graphical presentation.

FIG. 4 is a drawing showing an example of the operation screen for setting the copy function displayed on the LCD touch panel 51.

The controller 11 of the MFP 10 selects the copy mode in response to the choosing of the copy function (copy application) indicated by the function switching key 59. The controller 11 then switches the display screen of the LCD touch panel 51 to the operation screen for setting the copy function as shown in FIG. 4.

On the operation screen for setting the copy function, a message area is provided around the top center portion to present a message such as "Ready to copy", "Please wait", etc.

Around this message area, there are various function keys (operation instruction keys) as will be described below.

Under the message area, the following keys are provided. An automatic sheet selection key serves to enable an automatic transfer sheet selection. A transfer sheet selection key serves to select a transfer sheet manually. A same size key serves to select the copy magnification factor that achieves the same size as the original. Here, the copy magnification factor is a factor of image magnification of an image printed by the plotter in relation to the original image, and is sometimes referred to as a final-printed-image magnification factor. A sheet-specified magnification key serves to select a magnification factor for size enlargement/reduction automatically in accordance with the size of the selected transfer sheet. A cover-sheet/combined-sheet key serves to specify the setting for the cover-sheet/combined-sheet mode. An edit/print key serves to select an edit mode for specifying an editing operation such as the setting of a margin when binding the copies (copied sheets) after sorting, and also serves to select a print key setting for specifying the print setting such as a stamp, date, page, etc. A duplex/combined/divided key serves to select a duplex mode for printing images on both the front side and back side of a transfer sheet, a combined printing mode for printing multiple copy images on a single transfer sheet in a combined manner, and a divided printing mode for printing a single copy image on multiple transfer sheets in a divided manner. A magnification factor key serves to select a factor of size enlargement/reduction as a copy magnification factor.

On the left-hand side of the message area are provided a copy type key for selecting the type of the image to be copied, and an automatic density key for automatic adjustment of image density.

On the right-hand side of the message area are provided the following fields. An original-sheet quantity display field indicates the number of original sheets. A set quantity display field serves to indicate the number of sets (printed sets). A copied quantity display field serves to indicate the number of copied sheets. Under these fields, the following keys are provided. A sort key serves to select the processing that sorts each copy in the order of pages. A stack key serves to select the processing that separates copies into the stacks of the same pages. A staple key serves to select the processing that staples the sorted copies one set by one set.

FIG. 5 is a drawing showing an example of the operation screen for the scanner function displayed on the LCD touch panel 51.

When the function switching key 59 is pressed to switch to the scanner function, the control unit of the MFP 10 selects the scanner mode. This results in the display screen of the LCD touch panel 51 being switched to the operation screen shown in FIG. 5.

On the operation screen, a message area is provided around the top center portion to present a message such as "Ready to scan", "Please wait", etc.

Around this message area, there are various function keys (operation instruction keys), and a description thereof will be omitted.

In the following, an example of the functional configuration of the MFP 10 will be described in detail with reference to FIG. 6.

Figure 6:
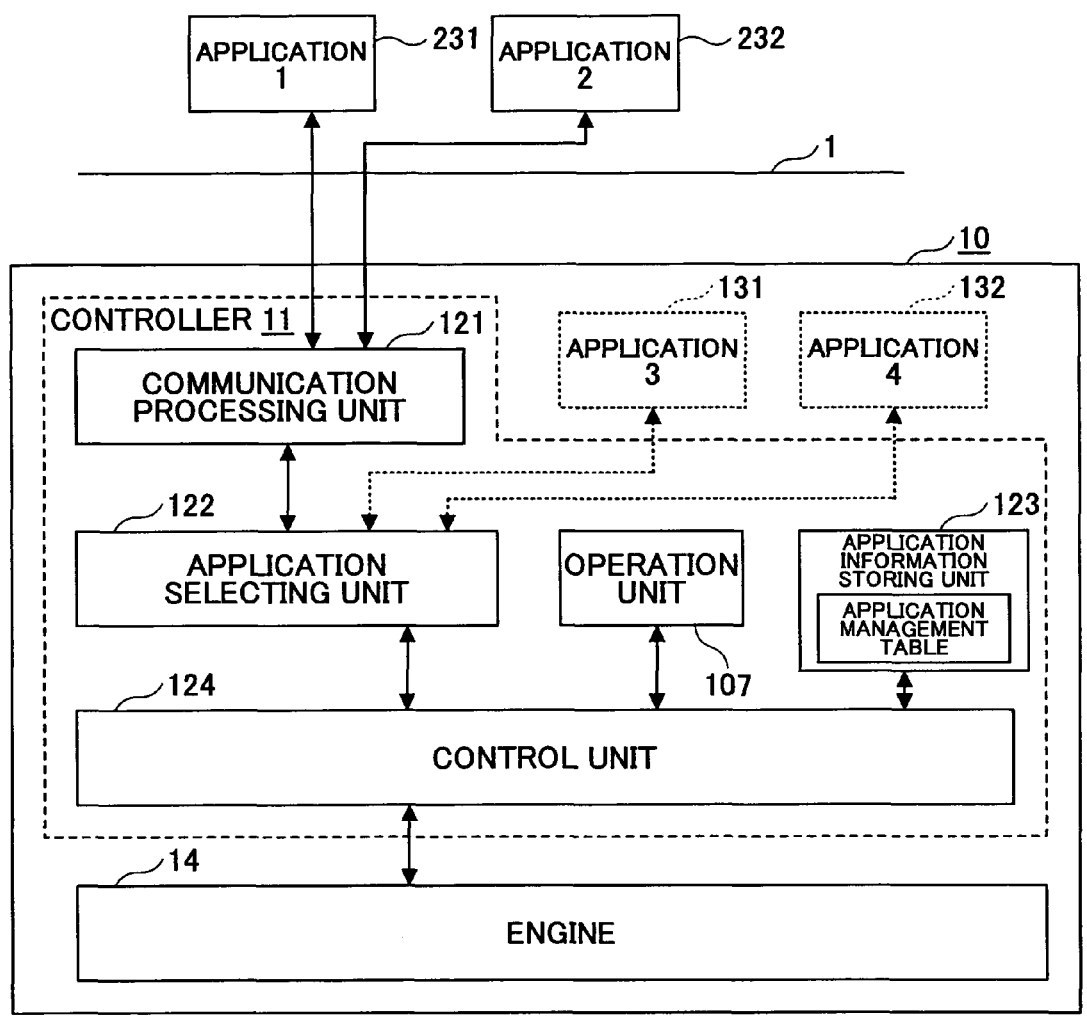
FIG. 6 is a block diagram showing an example of the functional configuration of the MFP.

FIG. 6 is a block diagram showing an example of the functional configuration of the MFP 10.

The controller 11 of the MFP 10 includes the functions of a communication processing unit 121, an application selecting unit 122, an application information storing unit 123, and a control unit 124. These functions are implemented by the CPU 101 shown in FIG. 2 as it operates according the programs stored in the ROM 104 to utilize the SDRAM 103, NVRAM 105, HDD 106, MAC I/F 111, USB I/F 109, and IEEE1394 I/F 110 selectively according to need.

The communication processing unit 121 communicates with applications (external applications) 231 and 232 provided in the external servers 20 (20a, 20b, and so on) connected through the network 1. The communication processing unit 121 also communicates with an external device that is directly connected. The external applications 231 and 232 may directly be connected, and communication therewith may as well be conducted.

The application selecting unit 122 receives data such as commands (operation requests) supplied from the external applications including the external applications 231 and 232, and passes the received data to the control unit 124. Further, the application selecting unit 122 receives data such as operation instructions from the control unit 124, and transmits the received data to the external applications inclusive of the external applications 231 and 232. In so doing, the destination application is identified for each data, and each data is transmitted to the identified destination. The application selecting unit 122 thus serves as an application registering unit and an application selecting unit. If applications (internal applications) are stored in the ROM 204 or the HDD 206, the same processing as applied to the external applications may be applied to these internal applications.

The application information storing unit 123 stores information in an application management table for the purpose of managing external applications. Such information includes the locations (IP addresses) of available external applications, i.e., the locations of the external servers 20 in which these external applications are installed, and also includes the types of the available external applications. Based on this information, it is possible to register an available application in the MFP 10. The application information storing unit 123 exists in the SDRAM 103, NVRAM 105, or HDD 106 shown in FIG. 2, and is updated each time the information is changed. The application information storing unit 123 serves as an application registering unit. If applications (internal applications) are stored in the ROM 204 or the HDD 206, these applications may be registered in the same manner as the external applications are registered.

The control unit 124 performs central control of the individual units inclusive of the communication processing unit 121, the application selecting unit 122, the operation unit 107, the application information storing unit 123, and the engine 14. The control unit 124 serves to perform the function of a control unit.

The control unit 124 communicates selectively with the external applications inclusive of the external applications 231 and 232 via the application selecting unit 122, the communication processing unit 121, and the network 1. In this manner, the control unit 124 utilizes the external applications selectively to provide the respective functions.

In the following, an example of the hardware configuration of the external server 20 will be described in detail with reference to FIG. 7.

Figure 7:
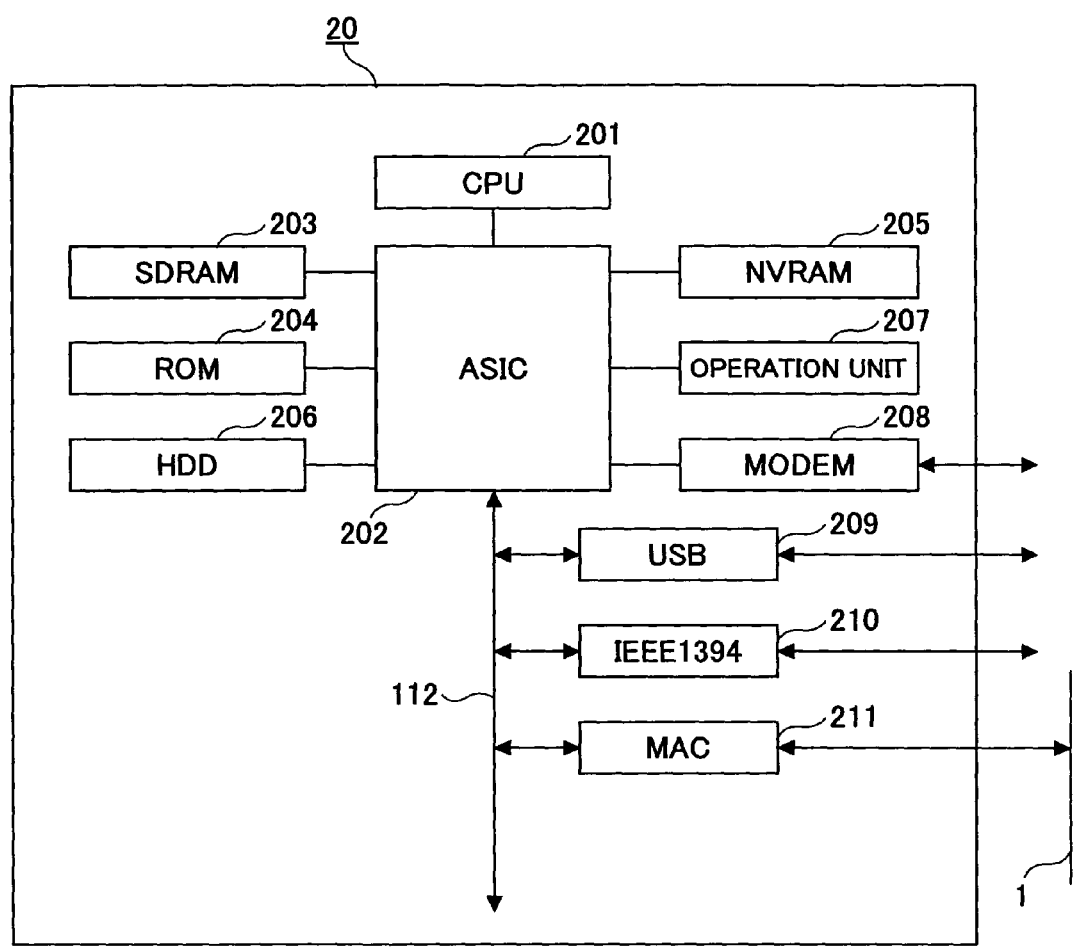
FIG. 7 is a block diagram showing an example of the hardware configuration of an external server.

FIG. 7 is a block diagram showing an example of the hardware configuration of the external server 20.

The external server 20 is an information processing apparatus such as a PC (personal computer), and includes a CPU 201, an ASIC 202, an SDRAM 203, a ROM 204, an NVRAM 205, an HDD 206, an operation unit 207, a modem 208, a USB I/F 209, an IEEE1394 I/F 210, and an MAC I/F 211.

The configuration of the external server 20 is almost identical to the configuration of the controller 11 described in connection with FIG. 2. Only a portion that differs will be described in the following.

The operation unit 207 includes an input device such as a keyboard and mouse for entering data such as operation instructions directed to the MFP 10, and also includes a display apparatus such as an LCD display or CRT display. A touch panel may be provided on the surface of the display apparatus.

In the following, an example of the functional configuration of the external server 20 will be described in detail with reference to FIG. 8.

Figure 8:
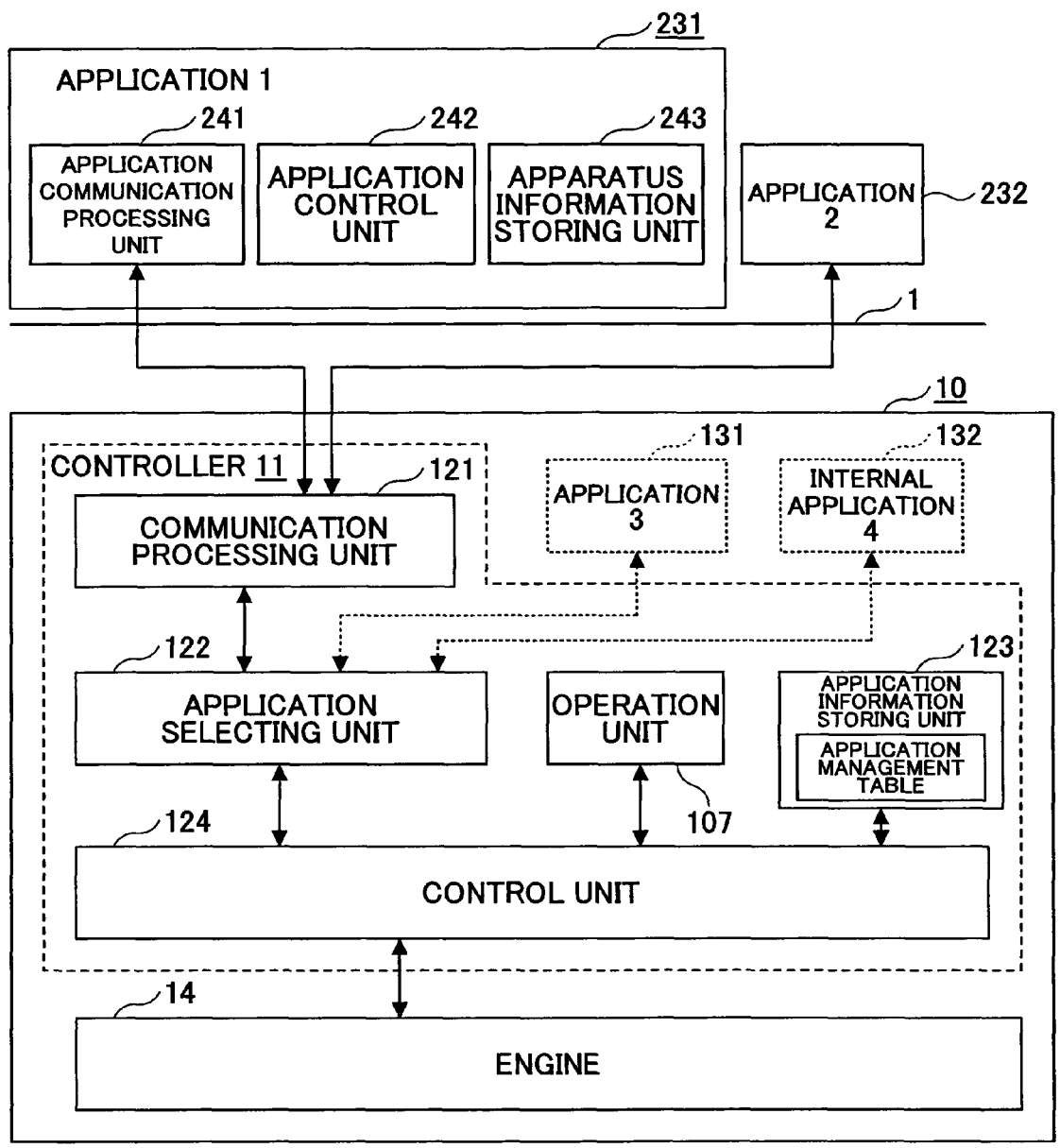
FIG. 8 is a block diagram showing an example of the functional configuration of the MFP and the external server.

FIG. 8 is a block diagram showing an example of the functional configuration of the MFP 10 and the external server 20a. For the sake of convenience of explanation, the illustration includes, in the external application 231, various units such as an application communication processing unit 241 and so on, which will be later described.

The external server 20a includes the functions of an application communication processing unit 241, an application control unit 242, and an apparatus information storing unit 243. These functions are implemented by the CPU 201 shown in FIG. 7 as it operates according the external application 231 stored in the ROM 104 to utilize the USB I/F 209, IEEE1394 I/F 210, and MAC I/F 211 selectively according to need.

The application communication processing unit 241 serves to communicate with the MFP 10 connected through the network 1 or an MFP that is directly connected.

The application control unit 242 serves to controls the application communication processing unit 241 and the apparatus information storing unit 243. The application control unit 242 serves to perform the function of a control unit.

The apparatus information storing unit 243 serves as an application storing unit that stores information about image processing apparatuses available to the external server 20a. Based on this information, the external server 20a can register an available information processing apparatus. The apparatus information storing unit 243 exists in the SDRAM 203, NVRAM 205, or HDD 206 shown in FIG. 7, and is updated each time the information is changed.

The functional configuration of the external server 20b is substantially identical to that of the external server 20a, and a description and illustration thereof will be omitted. The processes of the external applications inclusive of the external applications 231 and 232 provided in the external servers 20 (20a, 20b, and so on) are implemented by the respective CPUs 201 operating according to the external applications. For the sake of convenience of explanation, however, a description in the following may sometimes describe the external applications as those which perform the processes.

The external applications serve to provide various functions. That is, the external applications inclusive of the external applications 231 and 232 may be the copy application for providing the copy function, the printer application for providing the printer function, the scanner application for providing the scanner function, or the FAX application for providing the FAX function so as to provide a single function, or may be used as a combination of multiple applications. Any applications may be used. For example, the external application 231 (External Application-1) may serve to provide a basic (lower version) copy function and printer function, and the external application 232 (External Application-2) may serve to provide a basic scanner function and FAX function. Another external application (External Application-3) may then serve to provide a higher version copy function and printer function, and a further external application (External Application-4) may serve to provide a higher version scanner function and FAX function.

In addition to the MFP 10, another image processing apparatus such as a standalone printer, scanner, digital copier, or FAX apparatus may be connected through the network 1, or may be connected directly. Such image processing apparatus has a controller having the similar configuration to that of the MFP 10 (not shown), and may perform control according to the present invention as will later be described.

In the following, a detailed description will be given of the control according to the present invention performed by the first embodiment of the above-described image forming system with reference to FIG. 9 through FIG. 21.

[First Example of Control]

Figure 9:
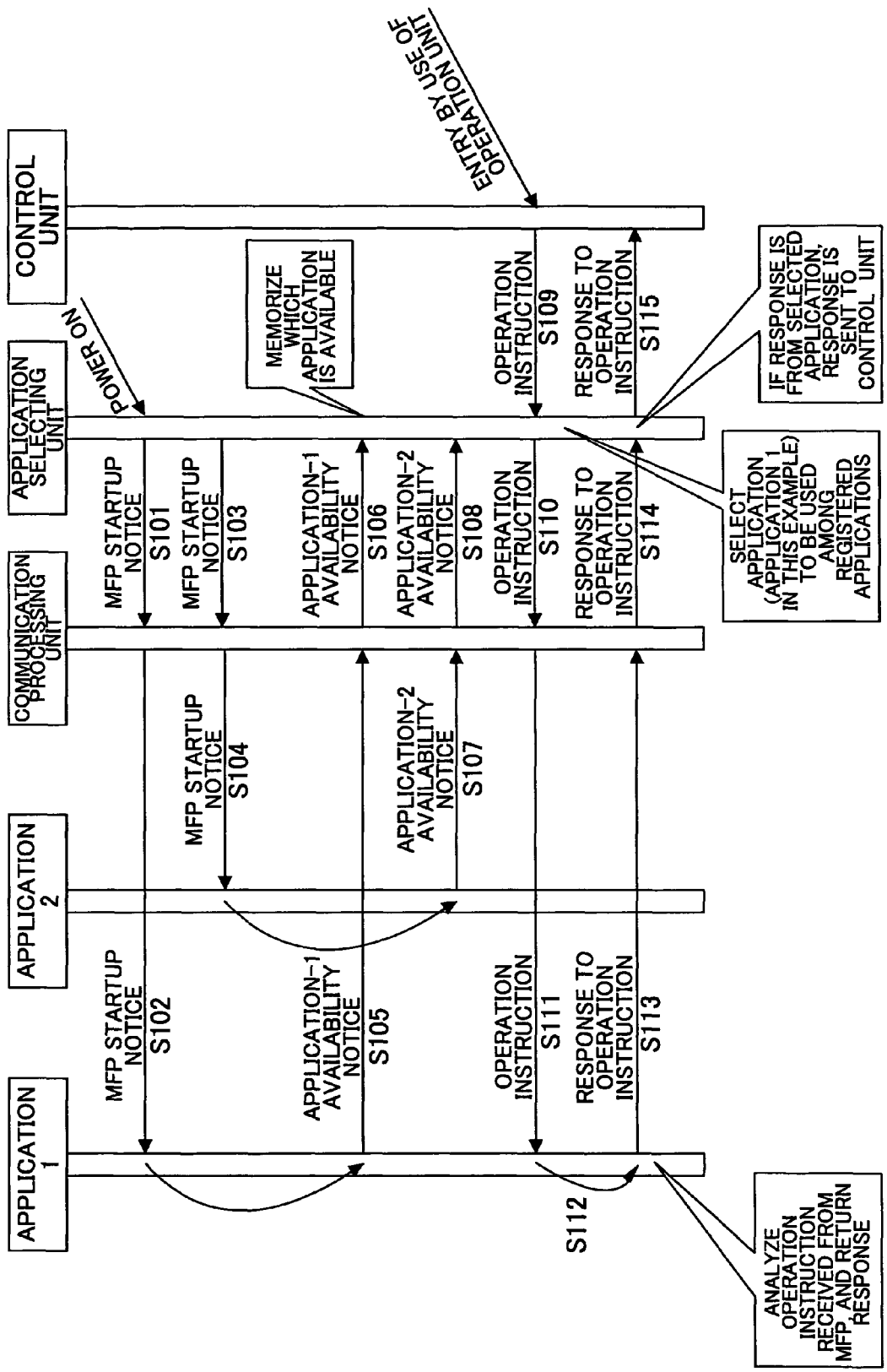
FIG. 9 is a drawing showing a first example of the communication sequence between external applications and the MFP at the time of startup of the MFP.

With reference to FIG. 9, a description will be given first of a first example (basic example) of the communication sequence between external applications provided in the external servers 20 and the MFP 10 at the time of the startup of the MFP. For the sake of convenience of explanation, the external applications include only the external applications 231 and 232.

FIG. 9 is a drawing showing a first example of the communication sequence between the external applications 231 and 232 and the MFP 10 at the time of startup of the MFP 10.

At the time of the startup (power-on), the application selecting unit 122 of the MFP 10 issues a startup notice (MFP startup notice) to the external applications 231 and 232 that are already registered (as indicated by the information stored in the application management table of the application information storing unit 123 shown in FIG. 6). Namely, the communication processing unit 121 is requested to transmit an MFP startup notice to the external applications 231 and 232 (Application 1 and Application 2) successively (S101 through S104). The MFP startup notice directed to the external applications 231 and 232 includes an application identification number indicative of the external applications 231 and 232, respectively. This application identification number is acquired from the application information storing unit 123 shown in FIG. 3 together with the information about the location of the site of the application.

In the following, the application management table stored in the application information storing unit 123 shown in FIG. 6 will be described with reference to Table 1. In an example shown in Table 1, four external applications are registered.

TABLE 1

| Application Name | IP Address of Application | Type of Application |
|---|---|---|
| Application-1 | XXX.XXX.XXX.XXX | Copy |
| Application-2 | YYY.YYY.YYY.YYY | Copy |
| Application-3 | ZZZ.ZZZ.ZZZ.ZZZ | Printer |
| Application-4 | VVV.VVV.VVV.VVV | Scanner |

This application management table stores (registers) therein an application name, application location information (IP address) indicative of the location where the application exists, and the type of the application, which are associated with each other, separately for each application on the network 1, for example. In this example, the external applications 231 and 232 (Application 1 and Application 2) are copy applications, another external application (Application 3) being a printer application, and a further external application (Application 4) being a scanner application. Between the external applications 231 and 232 that are copy applications, the external application 231 may be a higher version (latest version).

Now turning to FIG. 9 again, if the external server 20a having the external application 231 is running, the external application 231 receives the MFP startup notice from the MFP 10, and, in response to the notice, transmits an application availability notice (Application-1 availability notice) inclusive of its own identification information to the MFP 10 (i.e., the MFP 10 that transmitted the MFP startup notice) (S105).

If the external server 20b having the external application 232 is running, the external application 232 receives the MFP startup notice from the MFP 10, and, in response to the notice, transmits an application availability notice (Application-2 availability notice) inclusive of its own identification information to the MFP 10 (S106).

The application selecting unit 122 of the MFP 10 receives via the communication processing unit 121 the application-1 availability notice from the external application 231 and the application-2 availability notice from the external application 232. The application selecting unit 122 determines whether the external applications 231 and 232 are available or not based on the application identification information attached to the notices. In this example, the external applications 231 and 232 are both available, so that the application management table of the application information storing unit 123 is accessed to set the "available/unavailable" status therein to "available" with respect to the corresponding applications. That is, the external applications 231 and 232 are registered as available applications (S106, S108).

Thereafter, an operation instruction is entered by use of the operation unit 107. The application selecting unit 122 receives this operation instruction via the control unit 124 (S109), and, in response, accesses the contents of the application management table of the application information storing unit 123 to select (determine) an application (the external application 231 in this example) to be used among the available applications. The application selecting unit 122 then stores information about the selected application as a utilized application management table in the application information storing unit 123. The external application 231 (Application 1) is thus registered as a utilized application. The application selecting unit 122 then uses the communication processing unit 121 to transmit the received operation instruction to the external application 231 (S110, S111).

In the following, the utilized application management table will be described with reference to Table 2.

TABLE 2

| Type of Application | Name of Application |
|---|---|
| Copy | Application 1 |
| Printer | Application 3 |
| Scanner | Application 4 |

This utilized application management table stores therein the type of an application and the name of the application in one-to-one correspondence to each other separately for each utilized application. The utilized application management table shown in Table 2 shows an example in which three external applications are registered as utilized applications.

Upon receiving the operation instruction from the MFP 10, the external application 231 analyzes the contents of the operation instruction (S112). The external application 231 then transmits a request (command) for execution of a corresponding operation to the corresponding MFP 10 (i.e., the MFP 10 that transmitted the operation instruction) as a response to the received operation instruction (S113). For example, if the operation instruction is a copy instruction ordering to make two copies of the original, the contents of the instruction are analyzed to transmit a request (command) for execution of a copy operation for two copies to the MFP 10 as a response to the received copy instruction.

The application selecting unit 122 of the MFP 10 receives the response (execution request) to the operation instruction from the external application 231 via the communication processing unit 121. In response, the application selecting unit 122 supplies the response to the operation instruction to the control unit 124 (S114, S115).

Upon receiving the response to the operation instruction from the application selecting unit 122, the control unit 124 performs the operation requested by the response to the operation instruction (execution request).

In the processes described above, the MFP 10 transmits the MFP startup notices to the external applications at the time of power-on of the MFP 10. Alternatively, these notices may be transmitted at other timing (e.g., may be transmitted upon an instruction entered through a key operation on the operation unit 107). Alternatively, when an external application is activated while the power of the MFPs 10 is on, this external application may identify an MFP 10, and may transmit its own application availability notice to the identified MFP 10.

Figure 10:
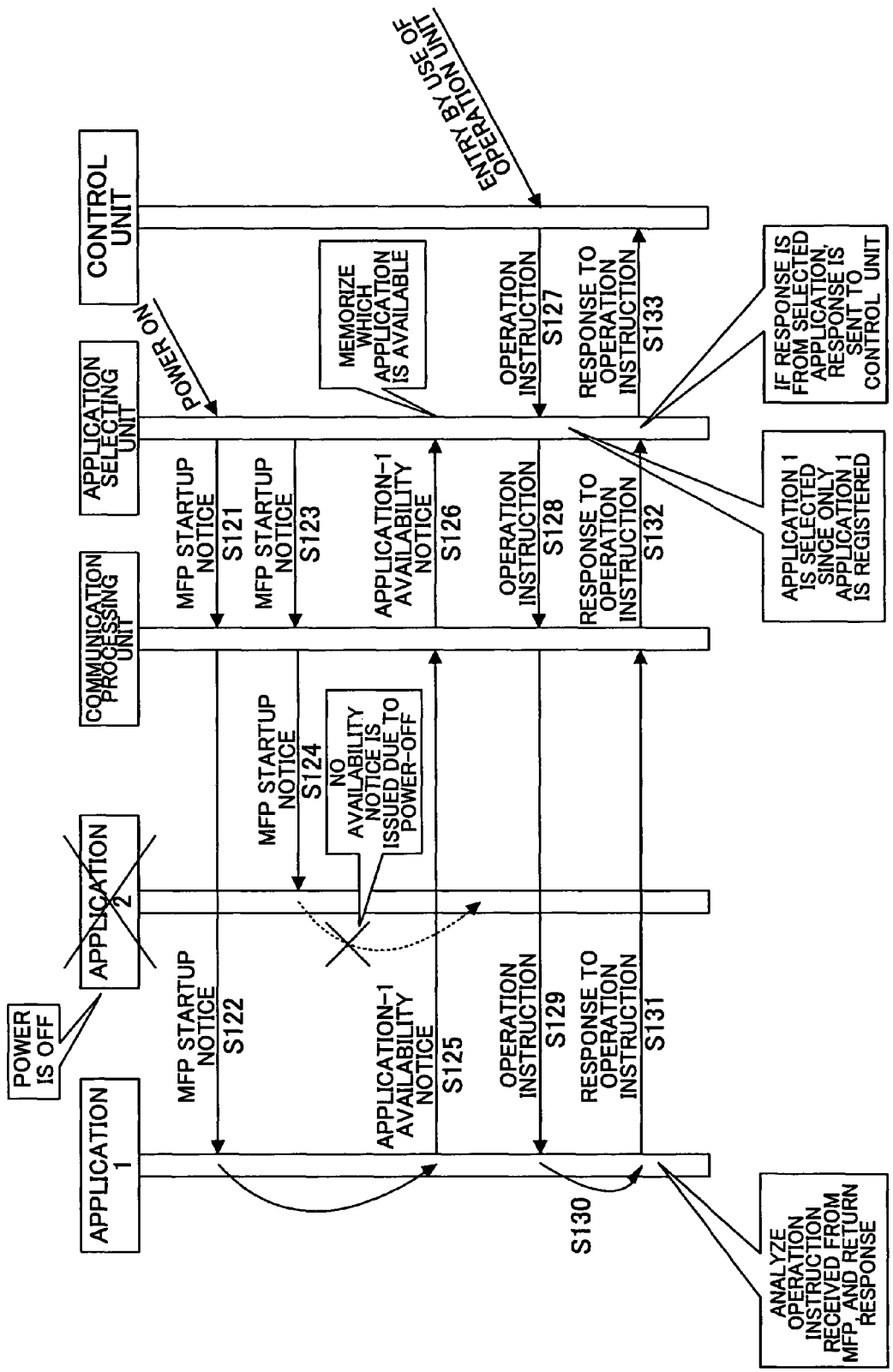
FIG. 10 is a drawing showing a second example of the communication sequence between the external applications and the MFP at the time of startup of the MFP.

With reference to FIG. 10, a description will be given of a second example of the communication sequence between external applications provided in the external servers 20 and the MFP 10 at the time of the startup of the MFP. For the sake of convenience of explanation, the external applications include only the external applications 231 and 232.

FIG. 10 is a drawing showing a second example of the communication sequence between the external applications 231 and 232 and the MFP 10 at the time of startup of the MFP 10.

Each unit of the MFP 10 performs the processes of steps S121 through S124 (identical to the processes of steps S101 through S104 described with reference to FIG. 9), thereby transmitting MFP startup notices to the external applications 231 and 232. In this example, the external server 20b provided with the external application 232 is out of service due to the power-off (or due to another factor such as a network failure), so that no communication with the external application 232 is possible (causing a communication error). The external application 232 thus does not return an application-2 availability notice.

The application selecting unit 122 of the MFP 10 receives via the communication processing unit 121 only the application-1 availability notice from the external application 231. The application selecting unit 122 determines that only the external application 231 is available based on the application identification information attached to the notice. The application management table of the application information storing unit 123 is accessed to set the "available/unavailable" status therein to "available" with respect to the corresponding application. That is, the external application 231 is registered as an available application (S125, S126).

Thereafter, an operation instruction is entered by use of the operation unit 107. The application selecting unit 122 receives this operation instruction via the control unit 124 (S127), and, in response, accesses the contents of the application management table of the application information storing unit 123 to select an application to be used among the available applications. In the example shown in FIG. 10, only the external application 231 (Application 1) is available. The external application 231 is thus selected, and information about the selected application is stored as a utilized application management table in the application information storing unit 123. The external application 231 (Application 1) is thus registered as a utilized application. The application selecting unit 122 then uses the communication processing unit 121 to transmit the received operation instruction to the external application 231 (S128, S129).

The processes of subsequent steps S130 through S133 are identical to the processes of steps S112 through S116 described with reference to FIG. 9, and a description thereof will be omitted.

It should be noted that other MFPs in addition to the MFP 10 may perform the same processes as those described with reference to FIG. 10.

Figure 11:
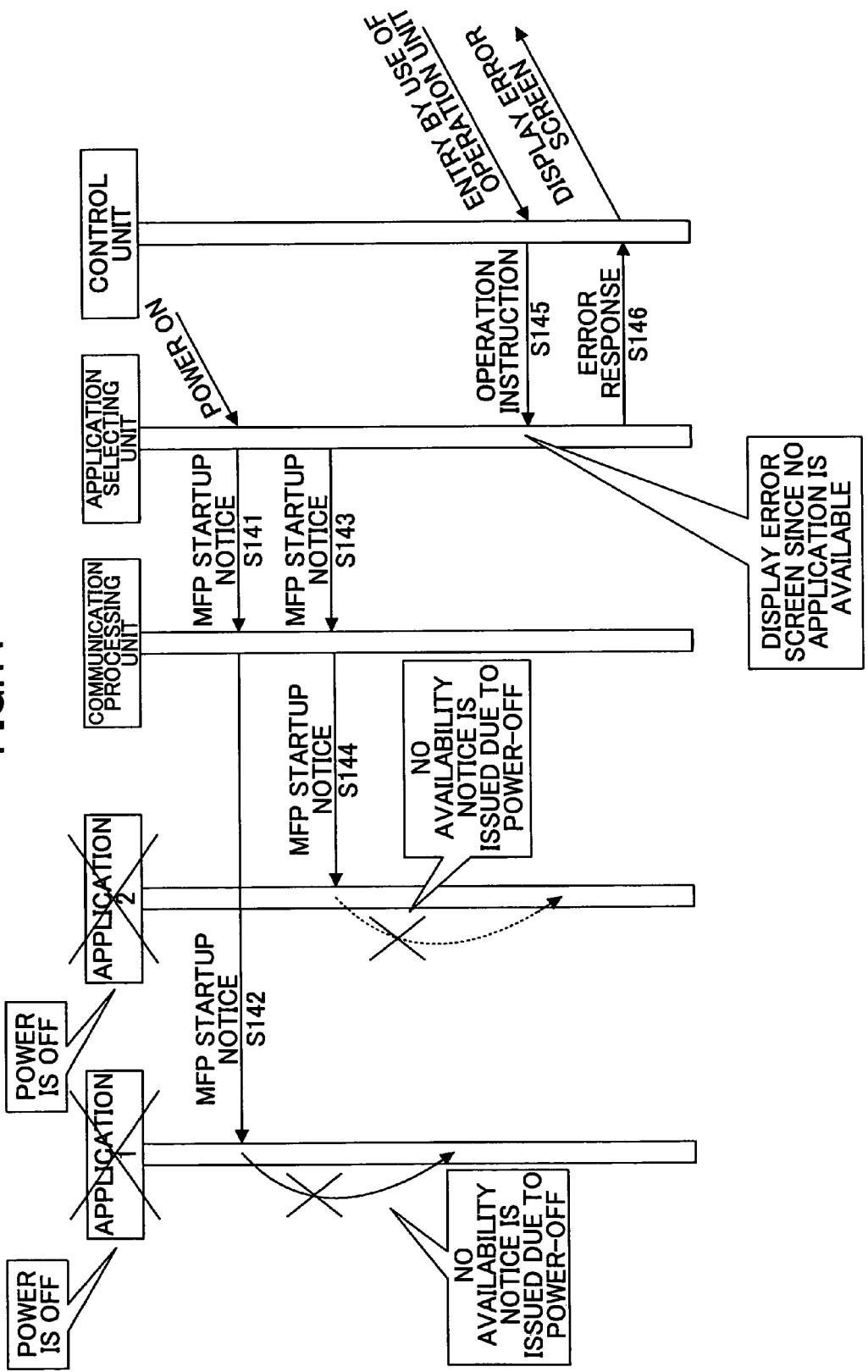
FIG. 11 is a drawing showing a third example of the communication sequence between the external applications and the MFP at the time of startup of the MFP.

With reference to FIG. 11, a description will be given of a third example of the communication sequence between external applications provided in the external servers 20 and the MFP 10 at the time of the startup of the MFP. For the sake of convenience of explanation, the external applications include only the external applications 231 and 232.

FIG. 11 is a drawing showing a third example of the communication sequence between the external applications 231 and 232 and the MFP 10 at the time of startup of the MFP 10.

Each unit of the MFP 10 performs the processes of steps S141 through S144 (identical to the processes of steps S101 through S104 described with reference to FIG. 9), thereby transmitting MFP startup notices to the external applications 231 and 232. In this example, the external servers 20a and 20b provided with the respective external applications 231 and 232 are out of service due to the power-off (or due to an other factor such as a network failure), so that no communication with the external applications 231 and 232 is possible. Neither the external application 231 nor the external application 232 returns an application availability notice.

Accordingly, the application selecting unit 122 of the MFP 10 does not register any one of the external applications 231 and 232 as an available application.

Thereafter, an operation instruction is entered by use of the operation unit 107. The application selecting unit 122 receives this operation instruction via the control unit 124 (S145), and, in response, accesses the contents of the application management table of the application information storing unit 123. Since no available application is registered, an error response is transmitted to the control unit 124 as a response to the received operation instruction (S146).

Upon receiving the error response, the control unit 124 displays an error screen (e.g., FIG. 12) on the operation unit 107 (on the LCD touch panel 51 to be exact) shown in FIG. 3. This serves to notify the user that the function corresponding to the operation instruction entered through the operation unit 107 cannot be used.

In the following, a first example of the process for determining an available application by the MFP 10 will be described with reference to FIG. 13 and FIG. 14.

Figure 13:
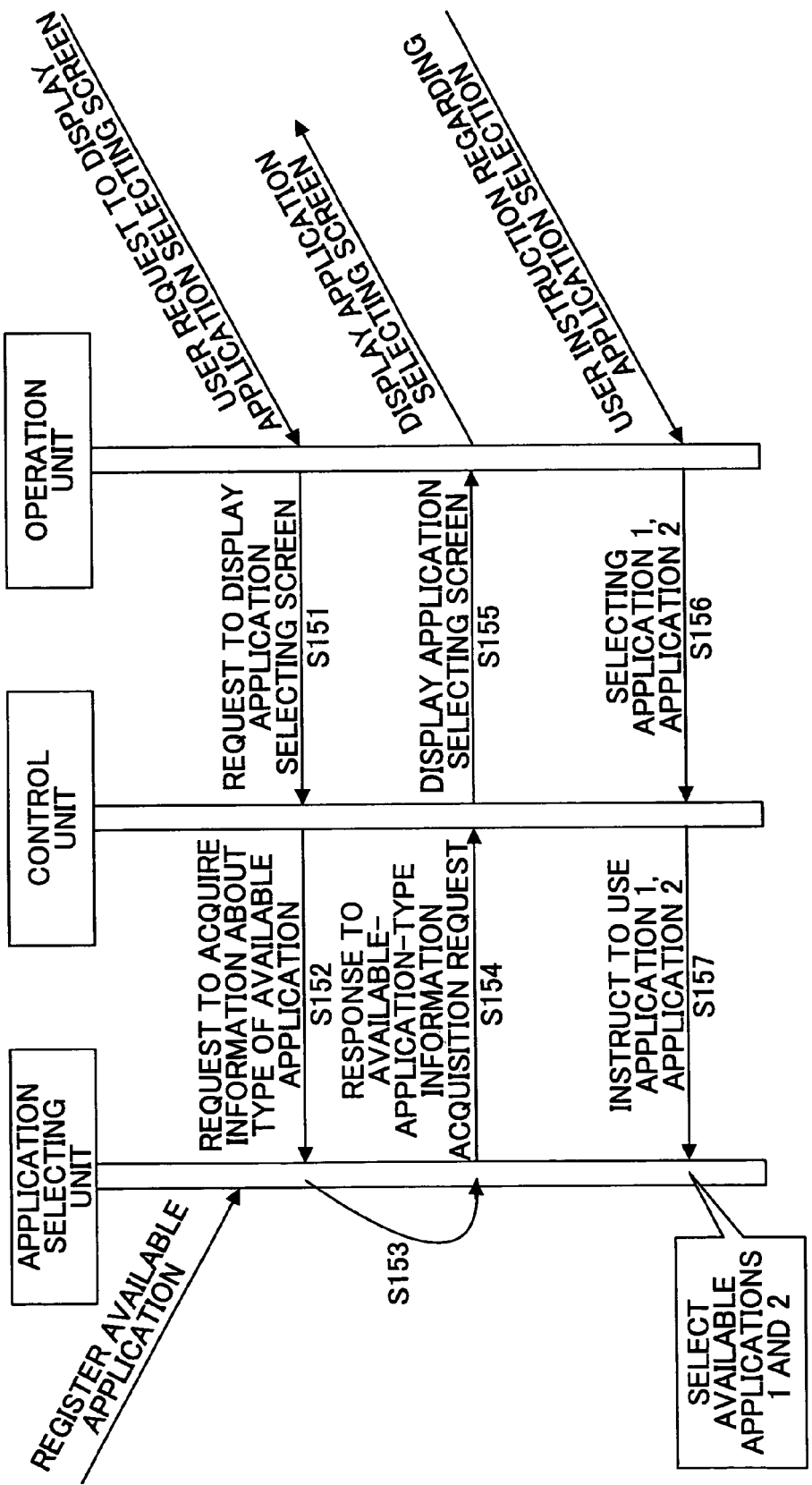
FIG. 13 is a drawing showing an example of the communication sequence performed in the MFP when the MFP determines an available application in response to key operations on the operation unit.

FIG. 13 is a drawing showing an example of the communication sequence performed in the MFP 10 when the MFP 10 determines an available application in response to key operations on the operation unit 107.

The control unit 124 of the MFP 10 may perform the processes described in connection with FIG. 9 to register a plurality of external applications inclusive of the external applications 231 and 232. After this, a user operates keys on the operation unit 107 to enter a request to display an application selecting screen (S151). In response, the control unit 124 supplies to the application selecting unit 122 a request to acquire information about the types of the available applications (i.e., available-application-type information acquisition request) (S152).

Upon receiving the acquisition request, the application selecting unit 122 retrieves (reads) information about the types of the available applications from the application management table of the application information storing unit 123 (S153). The application selecting unit 122 then sends the retrieved information to the control unit 124 as a response to the available-application-type information acquisition request) (S154).

Upon receiving the response to the available-application-type information acquisition request from the application selecting unit 122, the control unit 124 displays an application selecting screen such as that shown in FIG. 14 on the operation unit 107 in accordance with the received response (S155).

In the following, a brief description will be given of the application selecting screen.

The application selecting screen presents information indicative of the characteristics of the applications available to the user. In the illustrated example, application type and version information are presented. In addition, the types of functions provided in the MFP 10 may be presented in detail, thereby providing a screen on the operation unit 107 that facilitates an easier user selection (what is important is to present what is available to the user).

Information about applications unavailable to the MFP 10 is not included in the list of choices.

Some applications may be unavailable because the options are not purchased, making the use of the application impossible, or because the size of the memory is not sufficient for proper operation of the application. Due to the reasons as described here, for example, applications are not allowed to be used.

In the illustrated example, a key operation (e.g., pressing of a button) by the user on the operation unit 107 effects the selection of an available application. Alternatively, an application to be utilized may be determined by selecting a default application. Without requiring a selection through key operations on the operation unit 107, the type of the application to be utilized may be stored in advance in the ROM 104, the NVRAM 105, or the HDD 106 shown in FIG. 2.

Now turning back to FIG. 13, key operations performed by the user on the application selecting screen determines the type of the applications to be utilized (which are the external applications 231 and 232 (Application 1 and Application 2) in this example). In response, the instruction to utilize these applications is supplied to the application selecting unit 122 (S156).

Upon receiving the instruction to utilize the external applications 231 and 232, the application selecting unit 122 identifies the external applications 231 and 232 as available applications, and registers these again.

In the following, a second example of the process for determining an available application by the MFP 10 will be described with reference to FIG. 15.

Figure 15:
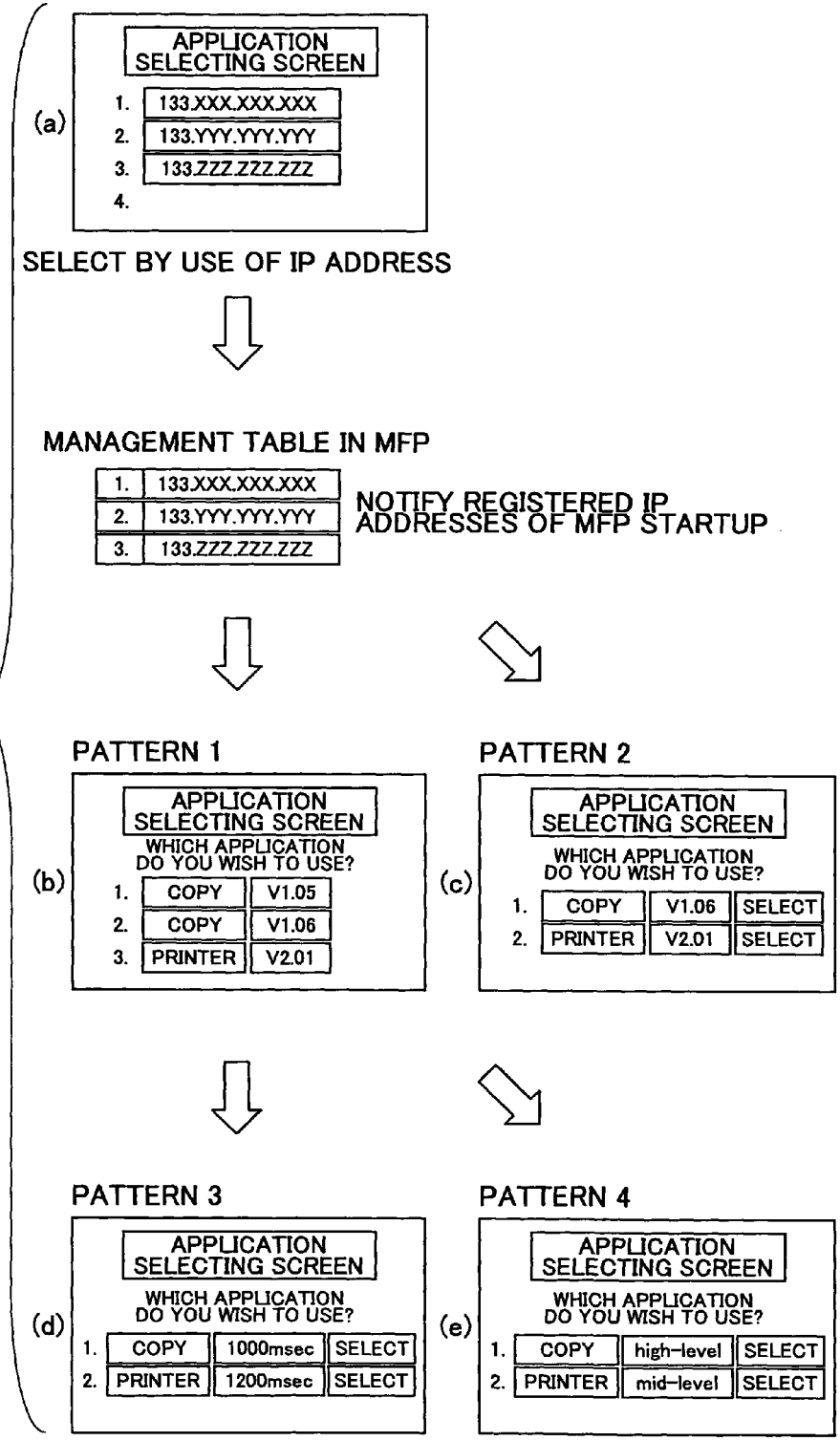
FIG. 15 is an illustrative drawing for explaining a second example of the process for determining an available application at the MFP.

FIG. 15 is an illustrative drawing for explaining a second example of the process for determining an available application at the MFP 10.

The application selecting unit 122 of the MFP 10 commences the processes described in connection with FIG. 9 at the time of power-on or at other timing (e.g., upon instruction entered through a key operation on the operation unit 107). The application selecting unit 122 then acquires the IP addresses of a plurality of external applications (three external applications in this example) including the external applications 231 and 232 that have already been registered. As shown in FIG. 15-(*a*), the control unit 124 displays an application selecting screen presenting these IP addresses on the operation unit 107. If provision is made such that key operations on the operation unit 107 allow an application selecting screen to be displayed on the operation unit 107, the service personnel may need to enter a predetermined PIN number through key operations on the operation unit 107 to enter a service maintenance mode. Alternatively, the administrator may need to enter a predetermined PIN number through key operations on the operation unit 107 to enter an administrator mode to display the application selecting screen.

After this, one or more IP addresses (possibly all the IP addresses) are selected on the application selecting screen. Based on the selected IP addresses, the communication processing unit 121 transmits MFP startup notices to the corresponding external applications.

Thereafter, the external applications (multiple external applications) to which the MFP startup notices were transmitted send back application availability notices. Upon receiving these notices, the application identification information attached to the notices is checked to determine that these external applications are available. The application management table of the application information storing unit 123 is accessed to set the corresponding "available/unavailable" status therein to "available", thereby registering the available applications.

Based on the contents of the application management table of the application information storing unit 123, an application selecting screen, which may be one of Pattern 1 through Pattern 4 shown in FIG. 15-(*b*) through (*e*), respectively, is displayed on the operation unit 107.

In the following, a brief description will be given of each of these application selecting screens.

The application selecting screen "Pattern 1" shown in FIG. 15-(*b*) presents the types and version numbers of all the external applications provided on the network 1, for example. Some or all of these external applications may be determined (selected) and registered as available applications.

The application selecting screen "Pattern 2" shown in FIG. 15-(*c*) presents, at first, the application of the highest version number (i.e., of the latest version) with respect to each external application of the same type. When a selection button is pressed with respect to a given external application, this external application is switched to another version. The external applications having version numbers as currently presented on the screen are selected and registered as available applications.

The application selecting screen "Pattern 3" shown in FIG. 15-(*d*) presents, at first, the application of the highest response performance with respect to each external application of the same type. When a selection button is pressed with respect to a given external application, this external application is switched to another version. The external applications having response performance as currently presented on the screen are selected and registered as available applications. How to measure the response performance (response time) will later be described with reference to the communication sequence of FIG. 23.

The application selecting screen "Pattern 4" shown in FIG. 15-(*e*) presents, at first, the application of the highest function level (e.g., the largest number of functions) with respect to each external application of the same type. When a selection button is pressed with respect to a given external application, this external application is switched to another version. The external applications having the function levels as currently presented on the screen are selected and registered as available applications. Since an external application having a high function level may be difficult to use due to its complicated usage, the user is given a choice of available applications according to the user need.

Provision may be made such that the applications initially presented on the application selecting screen "Pattern 2", "Pattern 3", or "Pattern 4" may be selected as available applications without exception, or may be excluded from available applications.

In the following, a third example of the process for determining an available application by the MFP 10 will be described with reference to FIG. 16.

Figure 16:
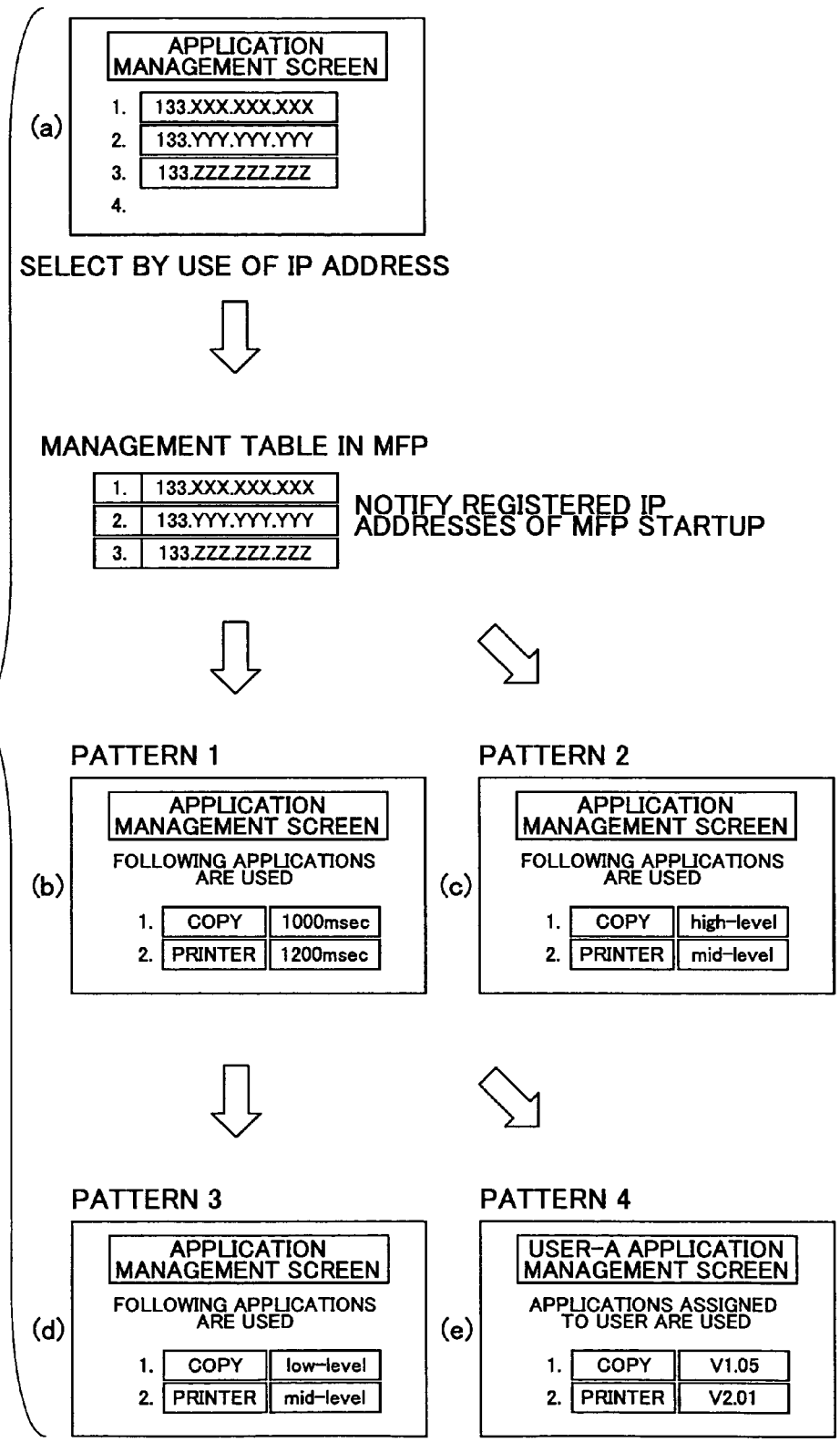
FIG. 16 is an illustrative drawing for explaining a third example of the process for determining an available application at the MFP.

FIG. 16 is an illustrative drawing for explaining a third example of the process for determining an available application at the MFP 10.

The application selecting unit 122 of the MFP 10 performs the processes similarly to the manner as described with reference to FIG. 15, thereby allowing one or more IP addresses (possibly all the IP addresses) to be selected on the application management screen (see FIG. 16-(*a*)) displayed on the operation unit 107. Based on the selected IP addresses, the communication processing unit 121 is requested to transmit MFP startup notices to the corresponding external applications. Thereafter, the external applications (multiple external applications) to which the MFP startup notices were transmitted send back application availability notices. Upon receiving these notices, the application identification information attached to the notices is checked to determine that these external applications are available. The application management table of the application information storing unit 123 is accessed to set the corresponding "available/unavailable" status therein to "available", thereby registering the available applications.

Based on the contents of the application management table of the application information storing unit 123, an application management screen, which may be one of Pattern 1 through Pattern 4 shown in FIG. 16-(*b*) through (*e*), respectively, is displayed on the operation unit 107. External applications to be utilized will then be determined (automatically selected) according to predetermined conditions.

In the following, a brief description will be given of each of these application management screens and how to select applications.

The application management screen "Pattern 1" shown in FIG. 16-(*b*) presents the application of the highest response performance with respect to each external application of the same type. The external applications having these presented response performance are selected and registered as available applications.

The application management screen "Pattern 2" shown in FIG. 16-(c) presents the application of the highest function level with respect to each external application of the same type. The external applications having these presented function levels are selected and registered as available applications.

The application management screen "Pattern 3" shown in FIG. 16-(d) presents the application of the lowest function level with respect to each external application of the same type. The external applications having these presented function levels are selected and registered as available applications.

The application management screen "Pattern 4" shown in FIG. 16-(e) is not immediately presented. At first, a screen for entering a login ID and password is presented. When a login ID and password are entered to match one of the registered login IDs and passwords, an application management screen presenting the types and version numbers of the applications assigned in advance to the corresponding user (e.g., USER-A), i.e., the application management screen "Pattern 4" shown in FIG. 16-(e), is displayed on the operation unit 107. The external applications presented on this application management screen are selected and registered as available applications.

An application management screen presenting the frequency of uses with respect to each external application may be presented. In accordance with the frequency of uses, the external applications to be utilized may be determined (e.g., by selecting the applications that are least frequently used).

The first example of control brings about advantages as described in the following.

(1) The MFP 10 (image processing apparatus) communicates with external applications, and performs its operations by utilizing these external applications. This allows a plurality of image processing apparatuses to share applications, thereby allowing each image processing apparatus to provide a plurality of functions at low cost. Further, the amount of labor necessary for the version update of the applications can be reduced. Moreover, internal applications may also be utilized to perform operations, thereby providing additional latitude.

(2) The MFP 10 registers as available applications a plurality of external applications with which communication is possible, and selects one or more external applications to be utilized from the registered applications. This allows an operation to be performed by utilizing an external application even if a server provided with another external application is out of service for some reason. The situation in which the MFP becomes out of service can thus be avoided.

[Second Example of Control]

Figure 17:
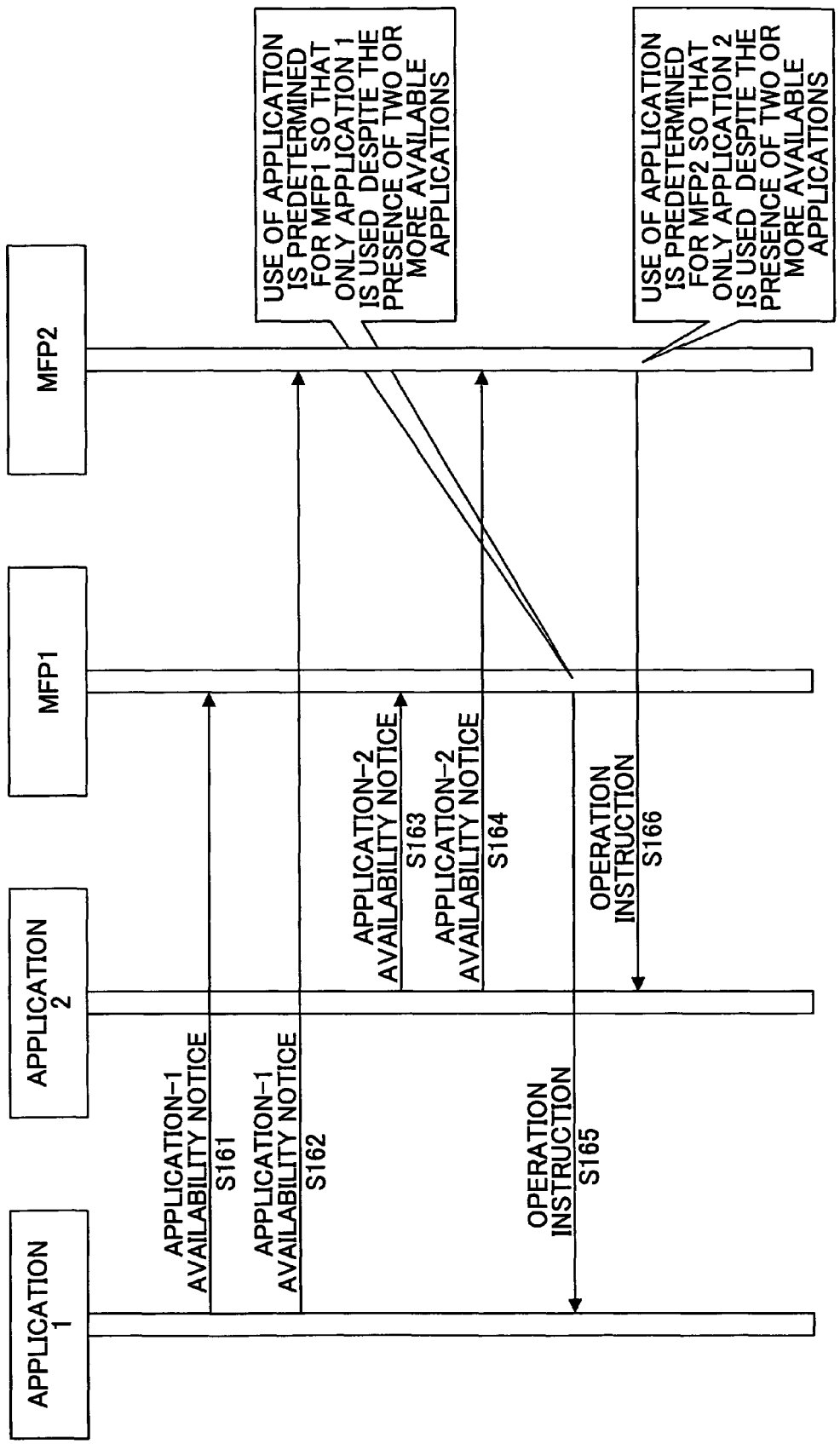
FIG. 17 is a drawing showing a first example of the communication sequence between the external applications and the MFPs at the time of startup of the external applications.

With reference to FIG. 17, a description will be given of a first example of the communication sequence between the MFPs 10 and external applications at the time of the startup of the external applications. For the sake of convenience of explanation, the external applications include only the two external applications 231 and 232, and the MFPs 10 include only two MFPs. These two MFPs are denoted as ah MFP 10a (MFP1) and an MFP 10b (MFP2).

FIG. 17 is a drawing showing a first example of the communication sequence between the external applications and the MFPs 10 at the time of startup of the external applications. In this example, the types of available applications are stored in the ROM 104, NVRAM 105, or HDD 106 (see FIG. 2) of the MFPs 10a and 10b in accordance with the model types of the respective MFPs 10.

The external application 231 (Application 1) transmits (S161) an application availability notice (Application-1 availability notice) inclusive of its identification information to the MFP 10a (MFP1) at the time of the startup (at the time of power-on of the external server 20a).

The external application 232 (Application 2) transmits (S162) an application availability notice (Application-2 availability notice) inclusive of its identification information to the MFP 10b (MFP2) at the time of the startup (at the time of the power-on of the external server 20b).

The application selecting unit 122 of the MFP 10a (MFP1) receives via the communication processing unit 121 the application-1 availability notice from the external application 231 (Application 1). In response, the application selecting unit 122 determines that the external application 231 is available based on the application identification information attached to the notice. The application selecting unit 122 then accesses the application management table of the application information storing unit 123 to set the corresponding "available/unavailable" status to "available". That is, the external application 231 is registered as an available application (S163).

Thereafter, an operation instruction is entered by use of the operation unit 107. The application selecting unit 122 receives this operation instruction via the control unit 124, and, in response, accesses the contents of the application management table of the application information storing unit 123. The application selecting unit 122 uses the communication processing unit 121 to transmit the received operation instruction to the external application 231 (Application 1) that is the available application (S165).

The application selecting unit 122 of the MFP 10b (MFP2) receives via the communication processing unit 121 the application-2 availability notice from the external application 232 (Application 2). In response, the application selecting unit 122 determines that the external application 232 is available based on the application identification information attached to the notice. The application selecting unit 122 then accesses the application management table of the application information storing unit 123 to set the corresponding "available/unavailable" status to "available". That is, the external application 232 is registered as an available application (S164).

Thereafter, an operation instruction is entered by use of the operation unit 107. The application selecting unit 122 receives this operation instruction via the control unit 124, and, in response, accesses the contents of the application management table of the application information storing unit 123. The application selecting unit 122 uses the communication processing unit 121 to transmit the received operation instruction to the external application 232 (Application 2) that is the available application (S166).

The second example of control can bring about the same advantage as described above in (1). Further, since the external applications are selected separately for each MFP model, optimum operations are achieved with respect to each MFP model.

[Third Example of Control]

Figure 18:
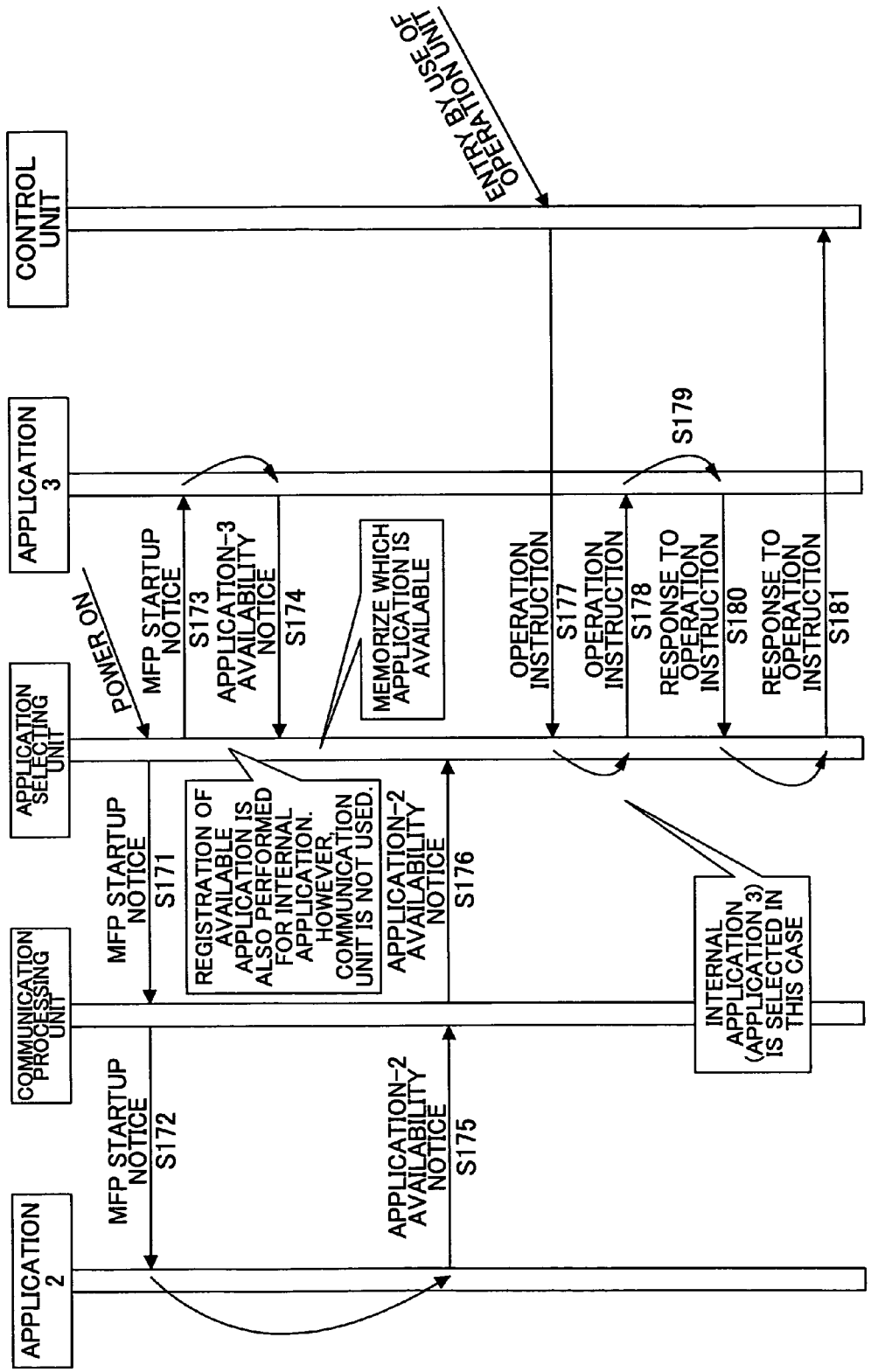
FIG. 18 is a drawing showing a fourth example of the communication sequence between the applications and the MFP at the time of startup of the MFP.

With reference to FIG. 18, a description will be given of a fourth example of the communication sequence between external applications provided in the external servers 20 and the MFP 10 at the time of the startup of the MFP. For the sake of convenience of explanation, the external applications include only the external application 232 (Application 2). Further, there is an internal application 131 (Application 3) as illustrated by dotted lines in FIG. 6.

FIG. 18 is a drawing showing a fourth example of the communication sequence between the applications and the MFP 10 at the time of startup of the MFP 10.

At the time of the startup (power-on), the application selecting unit 122 of the MFP 10 issues a startup notice (MFP startup notice) to the internal application 131 and the external application 232 already registered (as indicated by the information stored in the application management table of the application information storing unit 123 shown in FIG. 6). Namely, the communication processing unit 121 is requested to transmit an MFP startup notice to the external application 232 (Application 2) (S171, S172). Further, an MFP startup notice is supplied to the internal application 131 (Application 3) (S173).

The internal application (Application 3) 131 receives the MFP startup notice from the application selecting unit 122, and, in response to the notice, supplies an application availability notice (Application-3 availability notice) inclusive of its identification information to the application selecting unit 122 (S174).

Upon receiving the application-3 availability notice from the internal application 131, the application selecting unit 122 determines that the internal application 131 is available based on the application identification information attached to the notice. The application selecting unit 122 sets the corresponding "available/unavailable" status to "available" in the application management table of the application information storing unit 123. That is, the internal application 131 is registered as an available application.

If the external server 20b having the external application 232 is running, the external application 232 receives the MFP startup notice from the MFP 10, and, in response to the notice, transmits an application availability notice (Application-2 availability notice) inclusive of its own identification information to the MFP 10 (S175).

Upon receiving the application-2 availability notice from the external application 232 via the communication processing unit 121, the application selecting unit 122 of the MFP 10 determines that the external application 232 is available based on the application identification information attached to the notice. The application selecting unit 122 sets the corresponding "available/unavailable" status to "available" in the application management table of the application information storing unit 123. That is, the external application 232 (Application 2) is registered as an available application (S176).

Thereafter, an operation instruction is entered by use of the operation unit 107. The application selecting unit 122 receives this operation instruction via the control unit 124 (S177), and, in response, accesses the contents of the application management table of the application information storing unit 123 to select (determine) an application (the internal application 131 (Application 3) in this example) to be used among the available applications. The application selecting unit 122 then stores information about the selected application as a utilized application management table in the application information storing unit 123. The internal application 131 (Application 3) is thus registered as a utilized application. The application selecting unit 122 then transmits the received operation instruction to the internal application 131 (S178).

If more than one application is provided for choice, the application selecting unit 122 may select an application to be utilized according to predetermined priority. Such priority may prescribe that internal applications are given priority, or may prescribe that external applications are given priority. Alternatively, priority may be assigned according to application types. Needless to say, a selection may be made by entering an instruction through key operations on the operation unit 107.

Upon receiving the operation instruction from the application selecting unit 122, the internal application 131 analyzes the contents of the operation instruction (S179). The internal application 131 then transmits a request for execution of a corresponding operation to the application selecting unit 122 as a response to the received operation instruction (S180).

Upon receiving the response (execution request) to the operation instruction from the internal application 131, the application selecting unit 122 supplies the response to the operation instruction to the control unit 124 (S181).

Upon receiving the response to the operation instruction from the application selecting unit 122, the control unit 124 performs the operation requested by the response to the operation instruction (execution request).

In the processes described above, the MFP 10 transmits the MFP startup notices to the external application and the internal application at the time of power-on of the MFP 10. Alternatively, these notices may be transmitted at other timing (e.g., may be transmitted upon an instruction entered through a key operation on the operation unit 107).

The third example of control can bring about the same advantage as that described in (1).

Further, the MFP 10 registers as available applications not only external applications but also internal applications, and selects one or more applications to be utilized from the registered applications. This allows an operation to be performed by utilizing an external application or internal application even if a server provided with another external application is out of service for some reason. The situation in which the MFP becomes out of service can thus be reliably avoided.

[Fourth Example of Control]

Figure 19:
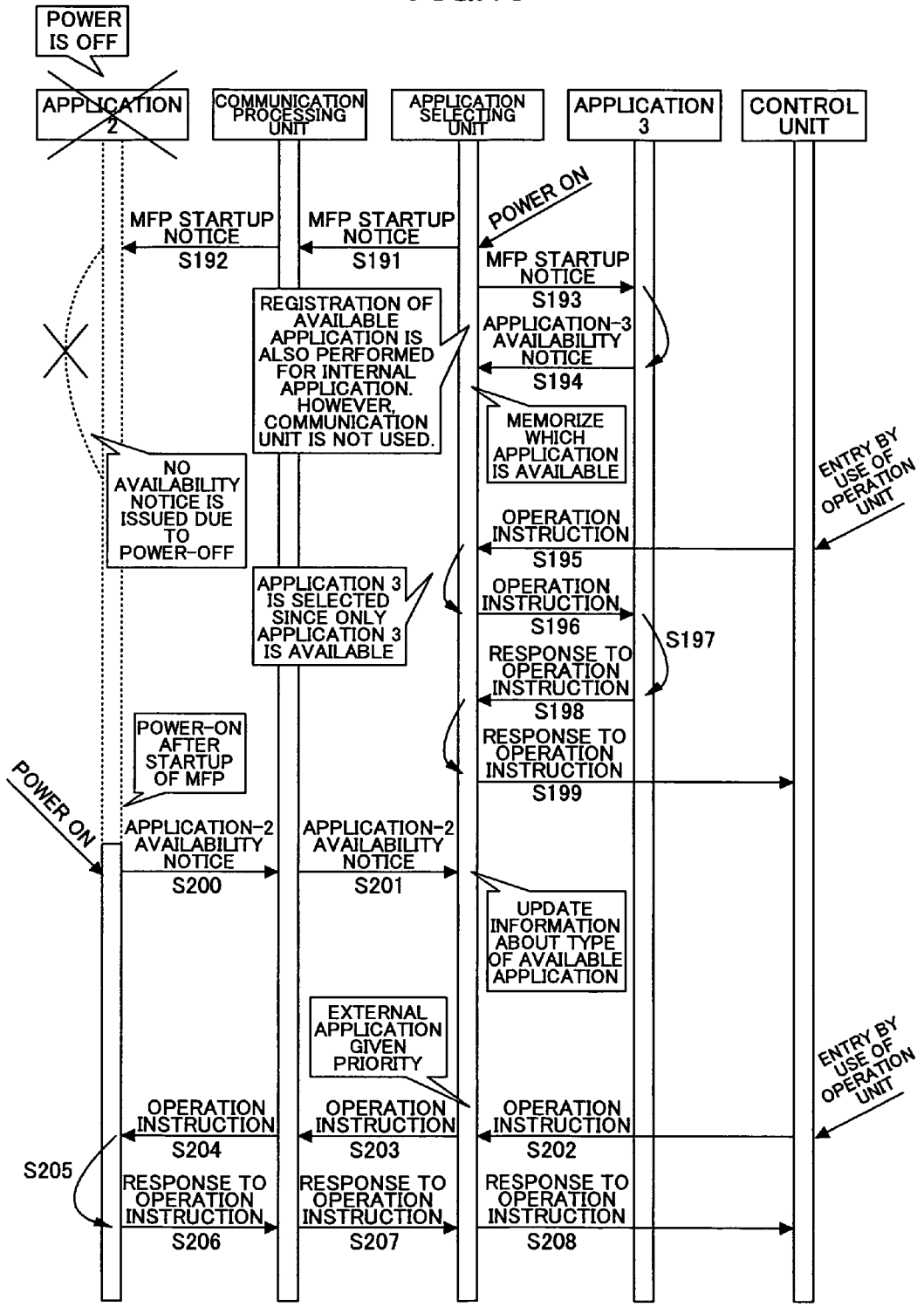
FIG. 19 is a drawing showing a fifth example of the communication sequence between the applications and the MFP at the time of startup of the MFP.

With reference to FIG. 19, a description will be given of a fifth example of the communication sequence between external applications provided in the external servers 20 and the MFP 10 at the time of the startup of the MFP. For the sake of convenience of explanation, the external applications include only the external application 232 (Application 2). Further, there is an internal application 131 (Application 3) as illustrated by dotted lines in FIG. 6.

FIG. 19 is a drawing showing a fifth example of the communication sequence between the applications and the MFP 10 at the time of startup of the MFP 10.

Each unit of the MFP 10 performs the processes of steps S191 through S194 (identical to the processes of steps S171 through S174 described with reference to FIG. 18), thereby transmitting MFP startup notices to the external application 232 (Application 2) and the internal application 131 (Application 3). In this example, the external server 20b provided with the external application 232 is out of service due to the power-off (or due to another factor such as a network failure), so that no communication with the external application 232 is possible. The external application 232 thus does not return an application-2 availability notice.

Upon receiving the application-3 availability notice from the internal application 131, the application selecting unit 122 determines that the internal application 131 is available based on the application identification information attached to the notice. The application selecting unit 122 sets the corresponding "available/unavailable" status to "available" in the application management table of the application information storing unit 123. That is, the internal application 131 is registered as an available application.

Thereafter, an operation instruction is entered by use of the operation unit 107. The application selecting unit 122 receives this operation instruction via the control unit 124 (S195), and, in response, accesses the contents of the application management table of the application information storing unit 123. Since only the internal application 131 (Application 3) is available, the internal application 131 (Application 3) is selected as a utilized application, and information about the utilized application is stored as a utilized application management table in the application information storing unit 123. The internal application 131 (Application 3) is thus registered as a utilized application. The application selecting unit 122 transmits the received operation instruction to the internal application 131 (S196).

Upon receiving the operation instruction from the application selecting unit 122, the internal application 131 analyzes the contents of the operation instruction (S197). The internal application 131 then transmits a request for execution of a corresponding operation to the application selecting unit 122 as a response to the received operation instruction (S198).

Upon receiving the response to the operation instruction from the internal application 131, the application selecting unit 122 supplies the response to the operation instruction to the control unit 124 (S199).

Upon receiving the response to the operation instruction from the application selecting unit 122, the control unit 124 performs the operation requested by the response to the operation instruction (execution request).

Thereafter, the external application 232 is activated through the power-on of the external server 20b or the like. Upon this, the external application 232 transmits an application availability notice (Application-2 availability notice) inclusive of its identification information to the MFP 10 (S200).

Upon receiving the application-2 availability notice from the external application 232 via the communication processing unit 121, the application selecting unit 122 of the MFP 10 determines that the external application 232 is available based on the application identification information attached to the notice. The application selecting unit 122 sets the corresponding "available/unavailable" status to "available" in the application management table of the application information storing unit 123, thereby updating the application management table. That is, the external application 232 (Application 2) is also registered as an available application (S176).

Thereafter, an operation instruction is entered by use of the operation unit 107. The application selecting unit 122 receives this operation instruction via the control unit 124 (S202), and, in response, accesses the contents of the application management table of the application information storing unit 123 to select an application to be used among the available applications. In this example, priority regarding application selection is predetermined such that the external applications are given priority. The external application 232 (Application 2) is thus selected as an application to be utilized. The application selecting unit 122 then stores information about the utilized application as a utilized application management table in the application information storing unit 123. The external application 232 (Application 2) is thus registered as a utilized application. The communication processing unit 121 is then requested to transmit the received operation instruction to the external application 232 (S203, S204).

Upon receiving the operation instruction from the MFP 10, the external application 232 analyzes the contents of the operation instruction (S205). The external application 232 then transmits a request (command) for execution of a corresponding operation to the corresponding MFP 10 as a response to the received operation instruction (S206).

Upon receiving the response to the operation instruction from the external application 232 via the communication processing unit 121, the application selecting unit 122 of the MFP 10 supplies the response to the operation instruction to the control unit 124 (S207, S208).

Upon receiving the response to the operation instruction from the application selecting unit 122, the control unit 124 performs the operation requested by the response to the operation instruction.

In the processes described above, the MFP 10 transmits the MFP startup notices to the external application and the internal application at the time of power-on of the MFP 10. Alternatively, these notices may be transmitted at other timing (e.g., may be transmitted upon an instruction entered through a key operation on the operation unit 107).

The fourth example of control can bring about the same advantages as those of the first example of control.

Further, when an external application becomes additionally available through communication, the MFP 10 registers this external application as an additionally available application. If the priority of use assigned to this additionally registered external application is high, the use of the external application improves the convenience of use for users.

[Fifth Example of Control]

Figure 20:
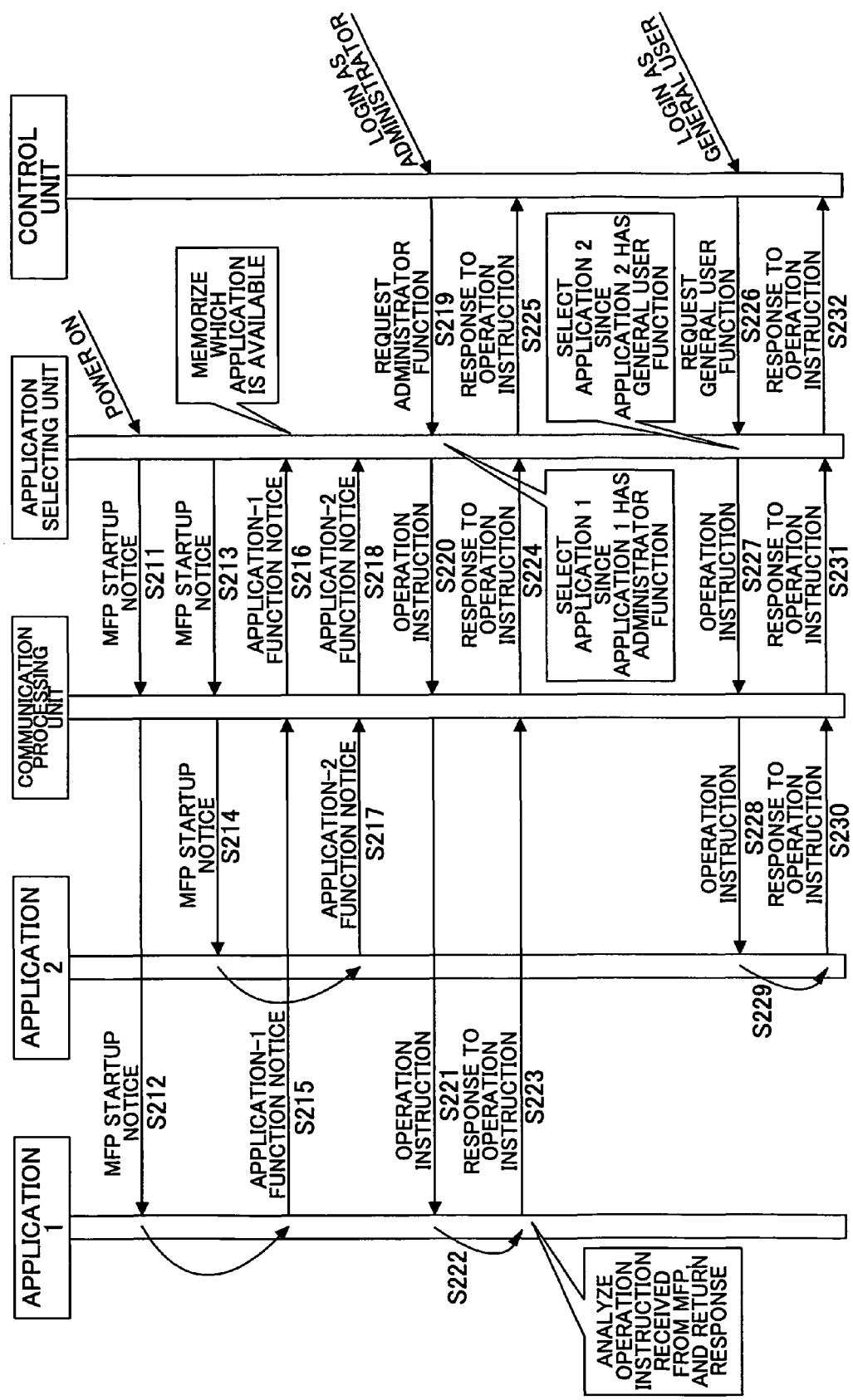
FIG. 20 is a drawing showing a sixth example of the communication sequence between the external applications and the MFP at the time of startup of the MFP.

With reference to FIG. 20, a description will be given of a sixth example of the communication sequence between external applications provided in the external servers 20 and the MFP 10 at the time of the startup of the MFP. For the sake of convenience of explanation, the external applications include only the two external applications 231 and 232.

FIG. 20 is a drawing showing a sixth example of the communication sequence between the external applications 231 and 232 and the MFP 10 at the time of startup of the MFP 10.

Each unit of the MFP 10 performs the processes of steps S211 through S214 (identical to the processes of steps S101 through S104 described with reference to FIG. 9), thereby transmitting MFP startup notices to the external applications 231 and 232.

If the external server 20a provided with the external application 231 is running, the external application 231 receives the MFP startup notice from the MFP 10, and, in response to the notice, transmits information indicative of installed functions (Application-1 function notice) inclusive of its identification information to the MFP 10 (S215).

If the external server 20b having the external application 232 is running, the external application 232 receives the MFP startup notice from the MFP 10, and, in response to the notice, transmits information indicative of installed (executable) functions (Application-2 function notice) inclusive of its identification information to the MFP 10 (S217).

The application selecting unit 122 of the MFP 10 receives via the communication processing unit 121 the application-1 function notice from the external application 231 and the application-2 function notice from the external application 232. The application selecting unit 122 determines that the external applications 231 and 232 are available based on the application identification information attached to the notices. Further, the application selecting unit 122 identifies the functions provided in the external applications 231 and 232, and stores information indicative of the functions provided by the external applications 231 and 232 in the application management table of the application information storing unit 123. These functions are thus registered (S216, S218).

Thereafter, a user administrator enters an administrator's login ID and password through key operations on the operation unit 107. If one of the registered login IDs and passwords match the entered login ID and password, the control unit 124 enters the special mode for use by the administrator. The control unit 124 supplies a request for administrator function to the application selecting unit 122 (S219).

Upon recording the request for administrator function from the control unit 124, the application selecting unit 122 selects an application having the administrator function (the external application 231 (Application 1) in this example) as an application to be utilized. The application selecting unit 122 stores information about the selected application as a utilized application management table in the application information storing unit 123. The external application 231 (Application 1) is thus registered as a utilized application. The application selecting unit 122 then uses the communication processing unit 121 to transmit the operation instruction corresponding to the administrator function to the external application 231 (S220, S221).

Upon receiving the operation instruction corresponding to the administrator function from the MFP 10, the external application 231 analyzes the contents of the operation instruction (S222). The external application 231 then transmits a request for execution of a corresponding operation to the corresponding MFP 10 as a response to the received operation instruction (S223).

Upon receiving the response to the operation instruction from the external application 231 via the communication processing unit 121, the application selecting unit 122 of the MFP 10 supplies the response to the operation instruction to the control unit 124 (S224, S225).

Upon receiving the response to the operation instruction from the application selecting unit 122, the control unit 124 performs the operation corresponding to the administrator function as requested by the response to the operation instruction (execution request).

A general user enters a user's login ID and password through key operations on the operation unit 107. If one of the registered login IDs and passwords match the entered login ID and password, the control unit 124 enters a standard mode for use by general users. The control unit 124 supplies a request for general user function to the application selecting unit 122 (S226).

Upon recording the request for general user function from the control unit 124, the application selecting unit 122 selects an application having the general user function (the external application 232 (Application 2) in this example) as an application to be utilized. The application selecting unit 122 stores information about the selected application as a utilized application management table in the application information storing unit 123. The external application 232 (Application 2) is thus registered as a utilized application. The application selecting unit 122 then uses the communication processing unit 121 to transmit the operation instruction corresponding to the general user function to the external application 232 (S227, S228).

Upon receiving the operation instruction corresponding to the general user function from the MFP 10, the external application 232 analyzes the contents of the operation instruction (S229). The external application 232 then transmits a request for execution of a corresponding operation to the corresponding MFP 10 as a response to the received operation instruction (S230).

Upon receiving the response to the operation instruction from the external application 232 via the communication processing unit 121, the application selecting unit 122 of the MFP 10 supplies the response to the operation instruction to the control unit 124 (S231, S232).

Upon receiving the response to the operation instruction from the application selecting unit 122, the control unit 124 performs the operation corresponding to the general user function as requested by the response to the operation instruction (execution request).

In the processes described above, the MFP 10 transmits the MFP startup notices to the external applications at the time of power-on of the MFP 10. Alternatively, these notices may be transmitted at other timing (e.g., may be transmitted upon an instruction entered through a key operation on the operation unit 107).

The fifth example of control can bring about the same advantages as those described in (1).

Further, the MFP 10 registers as available applications the external applications with which communication is possible, and switches utilized external applications depending on whether the current user is the administrator or a general user. This ensures optimum operations for each of the administrator and general users, and improves the convenience of use for the administrator as well as the general users.

Figure 21A:
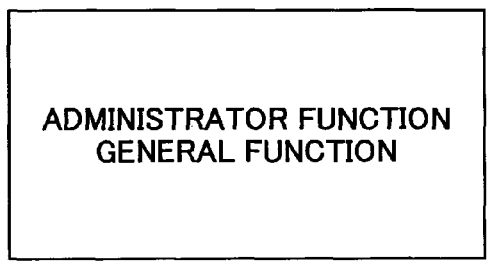
FIGS. 21A through 21D are illustrative drawings for explaining the functions of external applications.
Figure 21B:
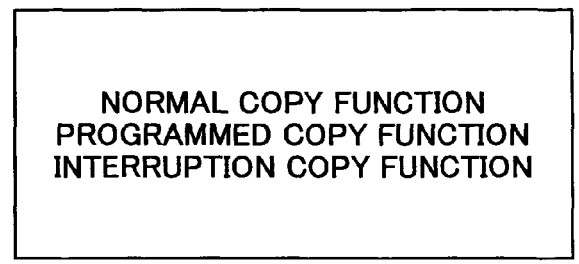
Figure 21C:
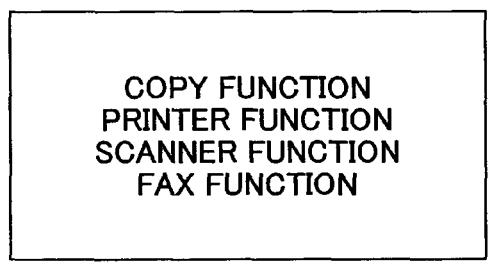
Figure 21D:
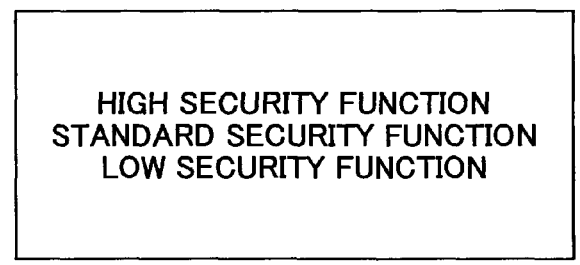

In the fifth example of control described above, the application selecting unit 122 of the MFP 10 is notified of the information indicative of installed functions from the external application provided with the administrator function as shown in FIG. 21A and the external applications provided with general user functions (general function), and registers these functions. Each of the external applications may be provided with the normal copy function, the programmed copy function, and the interruption copy function as shown in FIG. 21B. Each of the external applications may be provided with the copy function, the printer function, the scanner function, and the facsimile (FAX) function as shown in FIG. 21C. Each of the external applications may be provided with the high security function, the standard security function, and the low security function as shown in FIG. 21D. Provision may be made such that the external applications as described above report the functions as listed above, so that these functions can be registered.

[Sixth Example of Control]

Figure 23:
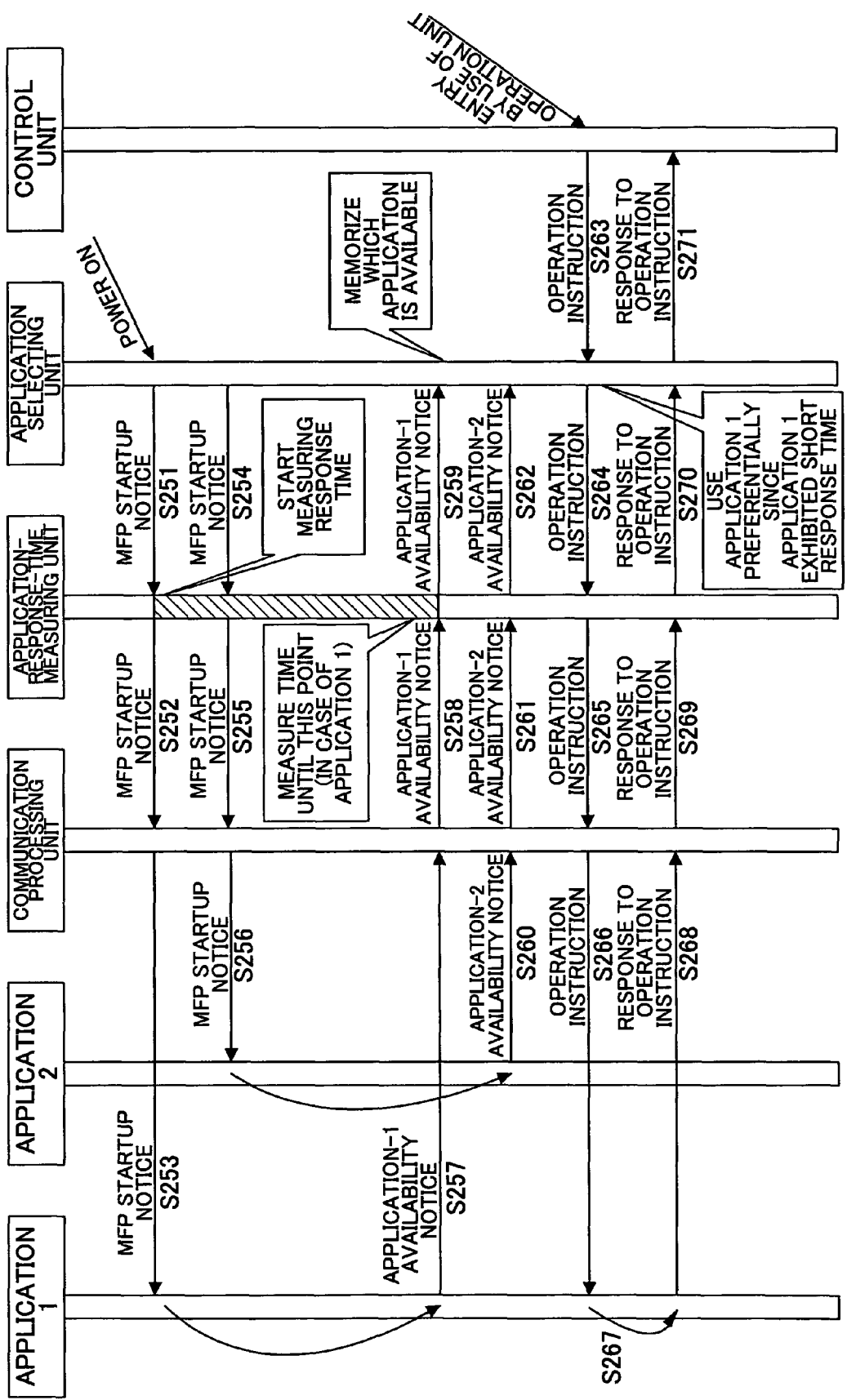
FIG. 23 is a drawing showing a seventh example of the communication sequence between the external applications and the MFP at the time of startup of the MFP.

With reference to FIG. 23, a description will be given of a seventh example of the communication sequence between external applications provided in the external servers 20 and the MFP 10 at the time of the startup of the MFP. In this example, the MFP operates by utilizing an application that has the highest response performance. For the sake of convenience of explanation, the external applications include only the two external applications 231 and 232.

Figure 22:
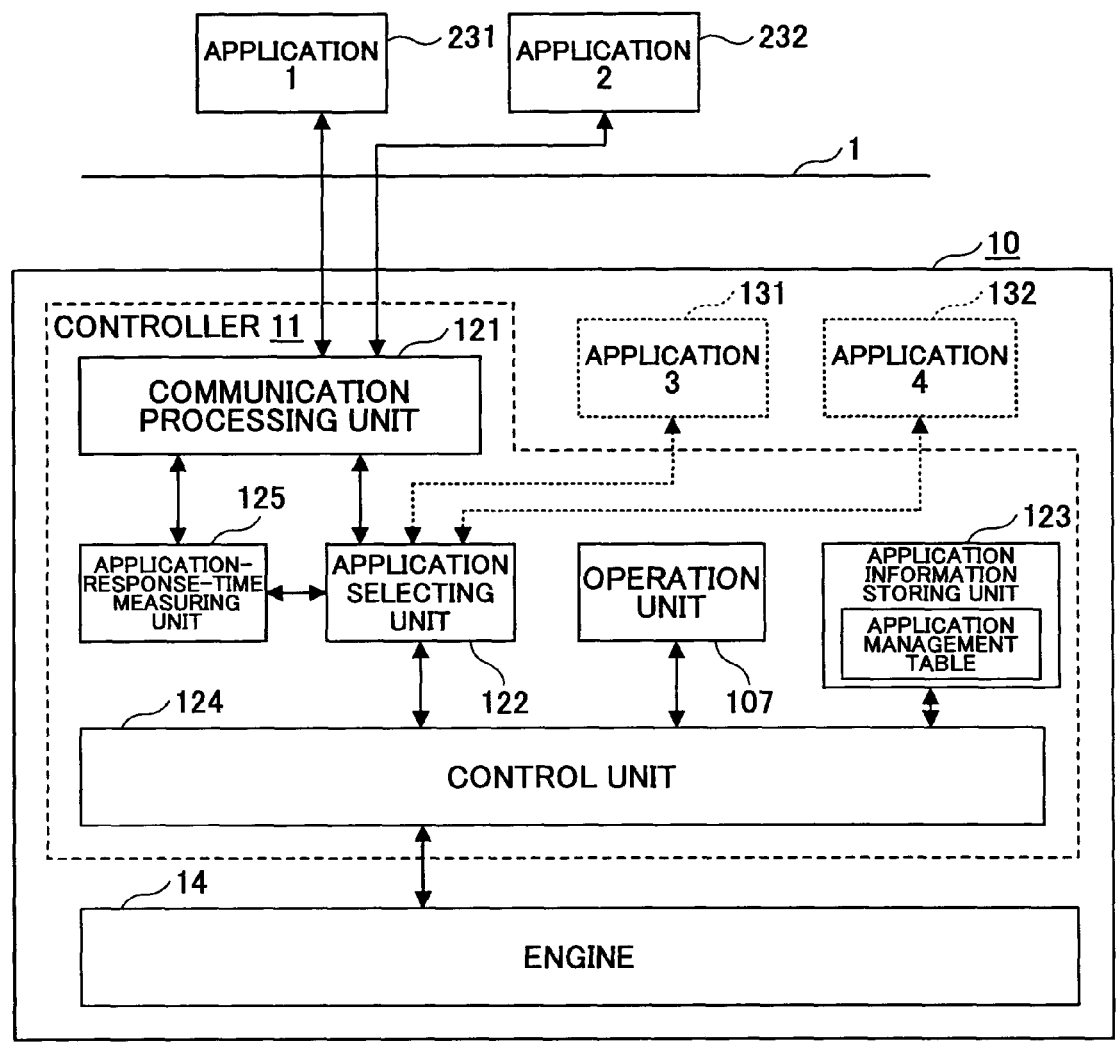
FIG. 22 is a block diagram showing an example of the functional configuration of the MFP.

FIG. 23 is a drawing showing a seventh example of the communication sequence between the external applications 231 and 232 and the MFP 10 at the time of startup of the MFP 10. In this example, the controller 11 of the MFP 10 includes the function of an application-response-time measuring unit 125 as shown in FIG. 22. The application-response-time measuring unit 125 serves to measure the time lapse from the transmission of an MFP startup notice to each of the external applications inclusive of the external applications 231 and 232.

At the time of the startup (power-on), the application selecting unit 122 of the MFP 10 issues a startup notice (MFP startup notice) to the external applications 231 and 232 that are already registered (as indicated by the information stored in the application management table of the application information storing unit 123 shown in FIG. 22). Namely, the communication processing unit 121 is requested via the application-response-time measuring unit 125 to transmit an MFP startup notice to the external applications 231 and 232 (Application 1 and Application 2) successively (S251 through S256). The MFP startup notice directed to the external applications 231 and 232 includes an application identification number indicative of the external applications 231 and 232, respectively. This application identification number is acquired from the application information storing unit 123 shown in FIG. 22 together with the information about the location of the site of the application.

When receiving the MFP startup notice directed to the external application 231 (Application 1) from the application selecting unit 122, the application-response-time measuring unit 125 starts measuring a response time Ta. When receiving the MFP startup notice directed to the external application 232 (Application 2) from the application selecting unit 122, the application-response-time measuring unit 125 starts measuring a response time Tb.

If the external server 20a having the external application 231 is running, the external application 231 receives the MFP startup notice from the MFP 10, and, in response to the notice, transmits an application availability notice (Application-1 availability notice) inclusive of its identification information to the MFP 10 (S257).

If the external server 20b having the external application 232 is running, the external application 232 receives the MFP startup notice from the MFP 10, and, in response to the notice, transmits an application availability notice (Application-2 availability notice) inclusive of its own identification information to the MFP 10 (S260).

The application selecting unit 122 of the MFP 10 receives, via the communication processing unit 121 and the application-response-time measuring unit 125, the application-1 availability notice from the external application 231 and the application-2 availability notice from the external application 232. The application selecting unit 122 determines whether the external applications 231 and 232 are available or not based on the application identification information attached to the notices. The application selecting unit 122 sets the corresponding "available/unavailable" statuses to "available" in the application management table of the application information storing unit 123. That is, the external applications 231 and 232 are registered as available applications (S257 through S262).

The application-response-time measuring unit 125 stops measuring the response time Ta when receiving the application-1 availability notice from the external application 231 (Application 1). Further, the application-response-time measuring unit 125 stops measuring the response time Tb when receiving the application-2 availability notice from the external application 232 (Application 2).

Thereafter, an operation instruction is entered by use of the operation unit 107. The application selecting unit 122 receives this operation instruction via the control unit 124 (S263), and, in response, refers to the contents of the application management table of the application information storing unit 123 and the response times Ta and Tb measured by the application-response-time measuring unit 125 to select an application to be used among the available applications. If the relationship between Ta and Tb is found to be Tb<Ta, for example, it is ascertained that the external application 231 (Application 1) has a better response performance. The external application 231 (Application 1) is thus selected as an application to be utilized.

If the internal applications 131 and 132 are provided as shown by dotted lines in FIG. 22, a higher performance is guaranteed by use of the internal applications, without a need to measure any response time. In this case, the internal applications may be selected as an application to be utilized. Further, such selection may be combined with the selection of functions. If there are a plurality of applications having the same function, the application with the highest response performance (shortest response time) may be selected as an application to be utilized.

After selecting the external application 231 (Application 1) as an application to be utilized, the application selecting unit 122 stores information about the selected application as a utilized application management table in the application information storing unit 123. The external application 231 (Application 1) is thus registered as a utilized application. The application selecting unit 122 then uses the communication processing unit 121 to transmit the received operation instruction to the external application 231 via the application-response-time measuring unit 125 (S264 through S266).

Upon receiving the operation instruction from the MFP 10, the external application 231 analyzes the contents of the operation instruction (S267). The external application 231 then transmits a request (command) for execution of a corresponding operation to the MFP 10 as a response to the received operation instruction (S268).

The application selecting unit 122 of the MFP 10 receives the response (execution request) to the operation instruction from the external application 231 via the communication processing unit 121 and the application-response-time measuring unit 125. In response, the application selecting unit 122 supplies the response to the operation instruction to the control unit 124 (S269 through S271).

Upon receiving the response to the operation instruction from the application selecting unit 122, the control unit 124 performs the operation requested by the response to the operation instruction (execution request).

In the processes described above, the MFP 10 transmits the MFP startup notices to the external applications at the time of power-on of the MFP 10. Alternatively, these notices may be transmitted at other timing (e.g., may be transmitted upon an instruction entered through a key operation on the operation unit 107).

The measurement of time (i.e., the response time of an external application) by the application-response-time measuring unit may be performed not only at the time of power-on (at the time of an MFP startup notice) but also at constant intervals when there is no ongoing MFP job. It should be noted that the measurement of time is not performed when there is an ongoing job. Alternatively or additionally, the measurement of time may be performed at the timing at which a new external application is added.

Further, the MFP 10 of the first embodiment may be connected to external applications not only through the network but also through other interfaces such as USB I/F or IEEE1394 I/F. Through the communication established in this manner, the external applications may be utilized.

Second Embodiment

In the following, a description will be given of an image forming system that is a second embodiment of the electronic apparatus system according to the present invention.

Figure 24:
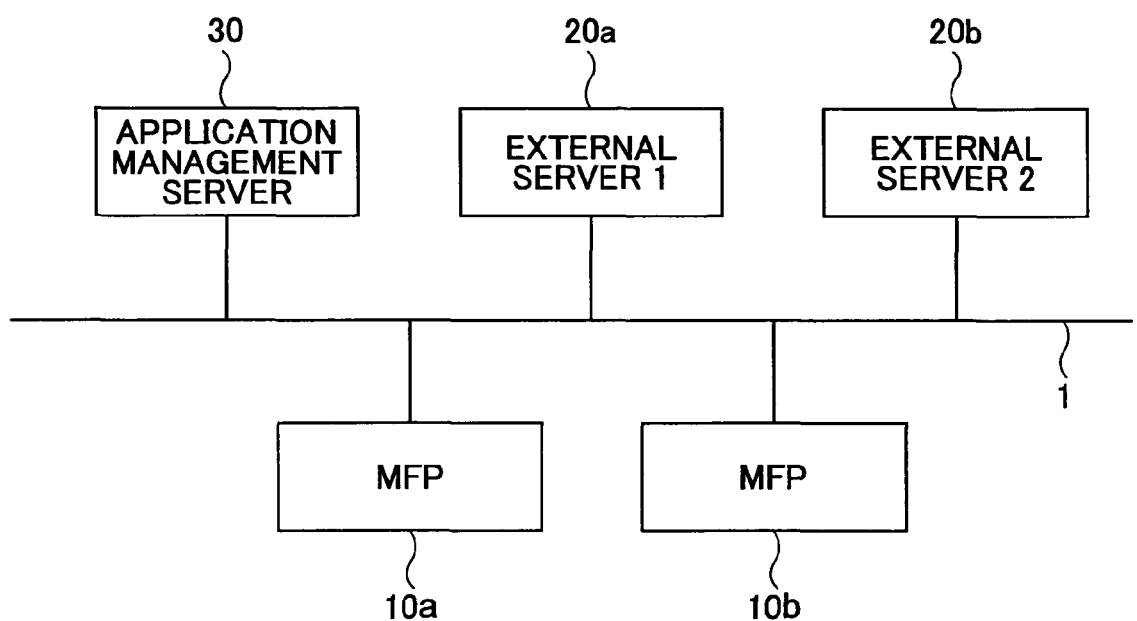
FIG. 24 is a schematic diagram showing an example of network connection of the image forming system.

FIG. 24 is a schematic diagram showing an example of network connection of the image forming system. In FIG. 24, the same elements as those of FIG. 1 are referred to by the same numerals.

This image forming system includes a plurality of MFPs 10 (10a, 10b, and so on) serving as electronic apparatuses equipped with a communication function, a plurality of external severs 20 (20a, 20b, and so on) serving as external apparatuses (application servers), and an application management server 30, which are connected to conduct communication with each other via the network 1 such as a LAM (local area network). It should be noted that the MFPs 10 and the external servers 20 can communicate with each other in one-to-many relationship via the network 1. If the MFPs 10 and the external servers 20 are coupled via communication links such as USB or IEEE1394, the MFPs 10 and the external servers 20 can communicate with each other in one-to-one relationship.

The hardware configuration of the MFPs 10 and the external servers 20 as well as the operation screen on the operation unit of the MFPs 10 are the same as those described with reference to FIG. 2 through FIG. 5 and FIG. 7, and a description thereof will be omitted. The hardware configuration of the application management server 30 is the same as the external server 20 less the operation unit, the USB I/F, and the IEEE1394 I/F, and a description thereof will be omitted.

Figure 25:
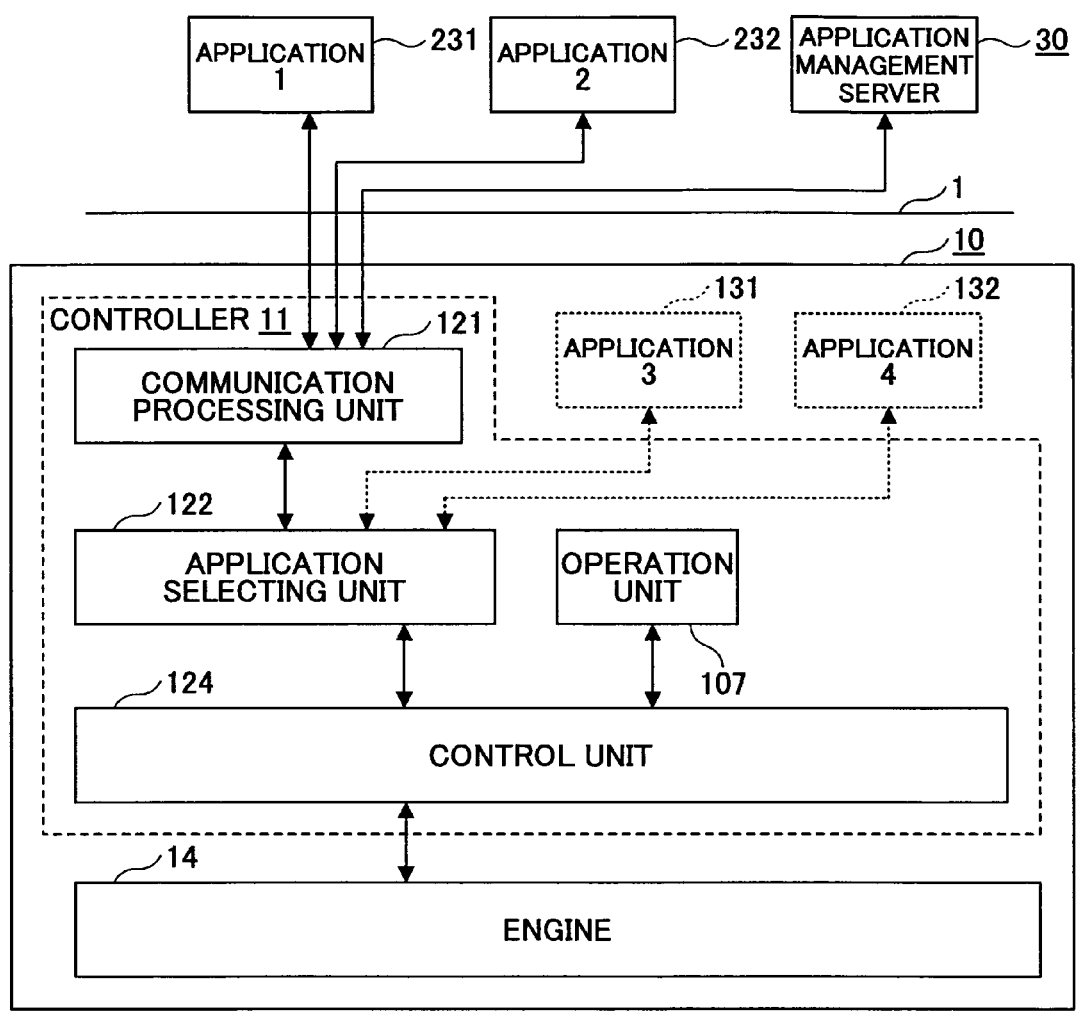
FIG. 25 is a block diagram showing an example of the functional configuration of the MFP shown in FIG. 24.

FIG. 25 is a block diagram showing an example of the functional configuration of the MFP 10 shown in FIG. 24. This configuration is the same as that shown in FIG. 6, except that no application information storing unit is provided, and a description thereof will be omitted.

Figure 26:
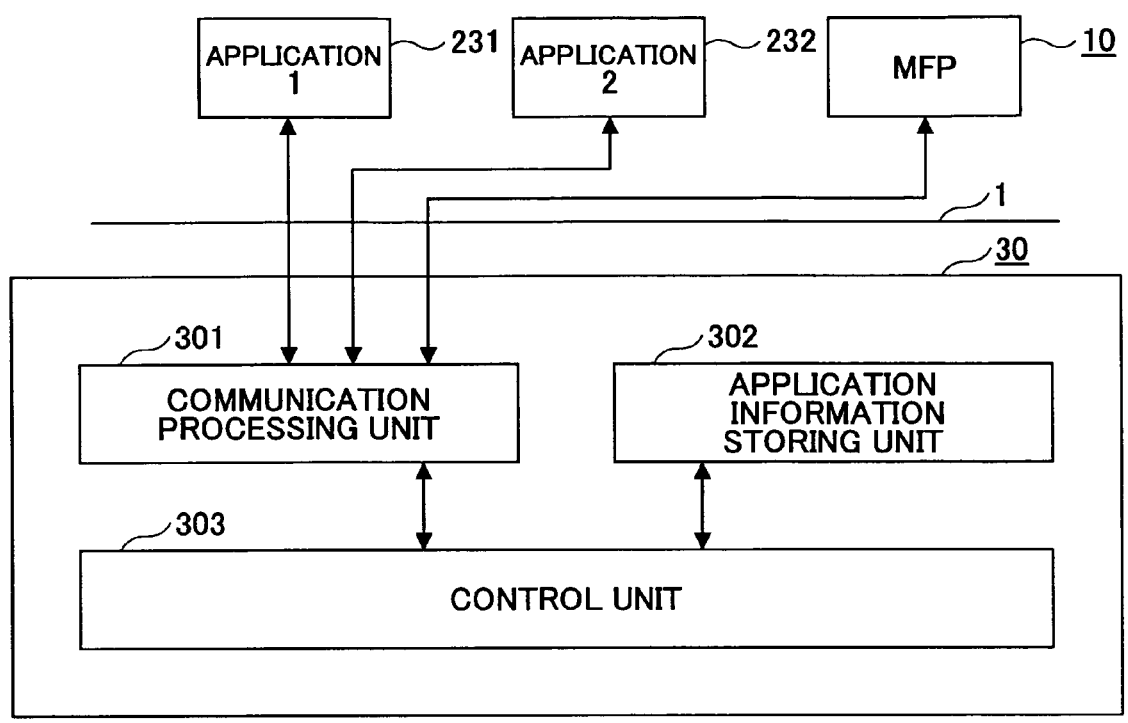
FIG. 26 is a block diagram showing an example of the functional configuration of an application management server shown in FIG. 24.

FIG. 26 is a block diagram showing an example of the functional configuration of the application management server 30 shown in FIG. 24.

The application management server 30 includes a communication processing unit 301, an application information storing unit 302, and a control unit 303.

The communication processing unit 301 communicates with the external applications 231 and 232 provided in the external servers 20 (20a, 20b, and so on) and the MFP 10 connected through the network 1. The communication processing unit 121 also communicates with an external device that is directly connected.

The application information storing unit 302 stores information in an application management table for the purpose of managing external applications. Such information includes the locations (IP addresses) of available external applications, i.e., the locations of the external servers 20 in which these external applications are installed, and also includes the types of the available external applications and information indicative of the operations (functions) executable by the available external applications. Based on this information, it is possible to register an available external application in each MFP 10. The application information storing unit 302 exists in the SDRAM, NVRAM, or HDD, and is updated each time the information is changed. The application information storing unit 302 serves as an application registering unit.

If applications (internal applications) are provided in the MFP 10, the application information storing unit 302 may also include information for managing these internal applications in the application management table. Such information includes the locations (IP addresses) of the internal applications, i.e., the locations of the MFPs 10 in which these internal applications are installed, and also includes the types of the internal applications and information indicative of the operations executable by the internal applications.

The control unit 303 performs central control of the individual units inclusive of the communication processing unit 301 and the application information storing unit 302. The control unit 303 serves to perform the function of a control unit.

The control unit 303 and the communication processing unit 301 together serve to function as an application information transmitting unit.

In the following, a detailed description will be given of the control (processing) according to the present invention performed by the second embodiment of the above-described image forming system with reference to FIG. 27 through FIG. 29.

[Second Example of Control]

Figure 27:
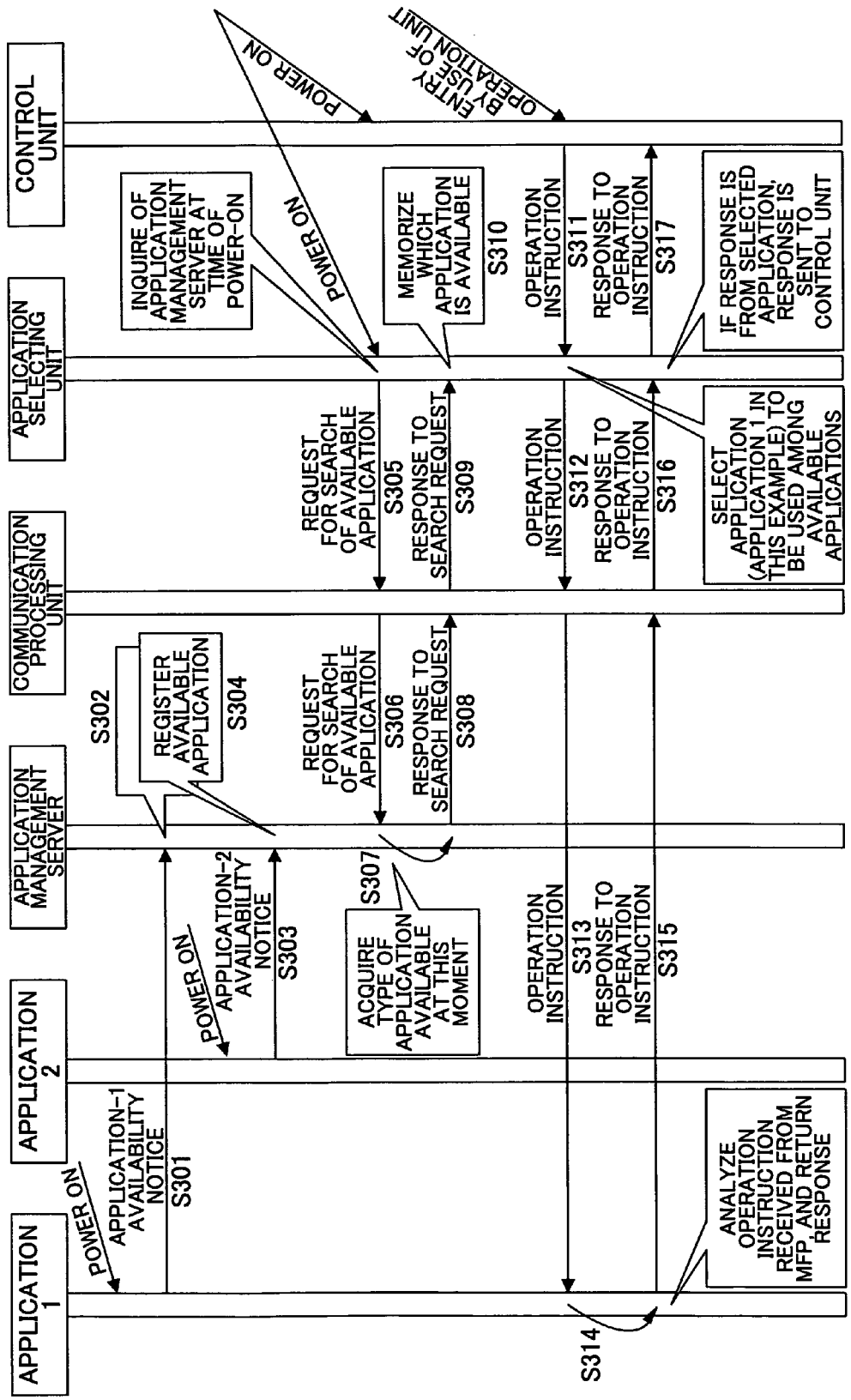
FIG. 27 is a drawing showing a first example of the communication sequence between the MFP, the external applications, and the application management server at the time of power-on or operation instruction of the MFP.

With reference to FIG. 27, a description will be given first of a first example (basic example) of the communication sequence between the FP 10, the external applications provided in the external servers 20, and the application management server 30 at the time of the power-on or operation instruction of the MFP 10. For the sake of convenience of explanation, the external applications include only the two external applications 231 and 232.

FIG. 27 is a drawing showing a first example of the communication sequence between the MFP 10, the external applications, and the application management server 30 at the time of power-on or operation instruction of the MFP 10.

The external application 231 (Application 1) is activated through the power-on of the external server 20a. Upon this, the external application 231 transmits an application availability notice (Application-1 availability notice) inclusive of its identification information and type information to the application management server 30 (S301).

The external application 232 (Application 1) is activated through the power-on of the external server 20b. Upon this, the external application 232 transmits an application availability notice (Application-2 availability notice) inclusive of its identification information and type information to the application management server 30 (S302).

Upon receiving the application-1 availability notice from the external application 231 (Application 1) via the communication processing unit 301, the control unit 303 of the application management server 30 determines that the external application 231 is available, and identifies the type of the external application 231 based on the application identification information and type information attached to the notice. The control unit 303 stores the name (application name), type, and IP address of the external application 231 in the application management table of the application information storing unit 302 in such a manner that the stored items are associated with each other, thereby updating the application management table. That is, the external application 231 is registered as an available application (S302).

Upon receiving the application-2 availability notice from the external application 232 (Application 2) via the communication processing unit 301, the control unit 303 of the application management server 30 determines that the external application 232 is available, and identifies the type of the external application 232 based on the application identification information and type information attached to the notice. The control unit 303 stores the name, type, and IP address of the external application 232 in the application management table of the application information storing unit 302 in such a manner that the stored items are associated with each other, thereby updating the application management table. That is, the external application 232 is registered as an available application (S304).

In the following, a description will be given of the application management table, MFP management table, and MFP-&-application association table stored in the application information storing unit 302 of the application management server 30 with reference to Table 3 through Table 5.

As shown in Table 3, the application management table stores therein information indicative of an application name, an IP address (application location information) indicative of the location where the application exists, and an application type separately for each application (external applications 231, 232, and so on) provided on the network 1. In this example, four external applications are registered.

Application-1 (provided with the copy function, printer function, and scanner function) corresponds to the first external application 231. Application-2 (provided with the copy function and printer function) corresponds to the second external application 232. Application-3 (provided with the copy function, printer function, and scanner function) corresponds to the third external application. Application-4 (provided with the scanner function) corresponds to the fourth external application. These applications may be provided with a plurality of types of functions as was described in connection with FIG. 21.

As shown in Table 4, the MFP management table stores therein an MFP name and an IP address (information indicative of the location of an MFP) separately for each MFP 10 provided on the network 1. In this example, four MFPs 10 are regesterd.

Table 5 shows the MFP-&-application association table. This table shows external applications that are currently available to each MFP 10.

Each external application may be provided with a plurality of functions.

TABLE 3

| Application Name | Application IP address | Copy | Printer | Scanner |
|---|---|---|---|---|
| Application-1 | 133.AAA.AAA.AAA | Yes | Yes | Yes |
| Application-2 | 133.BBB.BBB.BBB | Yes | Yes | No |
| Application-3 | 133.CCC.CCC.CCC | Yes | Yes | Yes |
| Application-4 | 133.DDD.DDD.DDD | No | No | Yes |

TABLE 4

| MFP Name | MFP IP address |
|---|---|
| MFP-A | 133.XXX.XXX.XXX |
| MFP-B | 133.YYY.YYY.YYY |
| MFP-C | 133.ZZZ.ZZZ.ZZZ |
| MFP-D | 133.VVV.VVV.VVV |

TABLE 5

| MFP Name | Copy Application | Printer Application | Scanner Application |
|---|---|---|---|
| MFP-A | Application-1 | Application-3 | Application-4 |
| MFP-B | Application-3 | Application-2 | Application-1 |
| MFP-C | Application-2 | Application-3 | Application-3 |
| MFP-D | Application-1 | Application-1 | Application-1 |

Turning back to FIG. 27, the application selecting unit 122 of the MFP 10 needs to inquire of the application management server 30 about available applications at the time of power-on. To this end, the application selecting unit 122 transmits a search request (available application search request) to the application management server 30 by use of the communication processing unit 121 (S305, S306).

Upon receiving the available application search request from the MFP 10 via the communication processing unit 301, the control unit 303 of the application management server 30 refers to the application management table of the application information storing unit 302. From the application management table, the control unit 303 retrieves the types of the available external applications 231 and 232 and the application location information (IP addresses) indicative of the locations of the external applications 231 and 232 (S307). The control unit 303 then transmits the retrieved information to the corresponding MFP 10 as a response (search result response) to the received available application search request (S308).

Upon receiving the search result response from the application management server 30 via the communication processing unit 121, the application selecting unit 122 of the MFP 10 stores the types of the available external applications 231 and 232 and the IP addresses indicative of their locations in a table format as shown in Table 1, for example, based on the search result response. Thus, the available external applications 231 and 232 are registered (S309, S310).

Thereafter, an operation instruction is entered by use of the operation unit 107. The application selecting unit 122 receives this operation instruction via the control unit 124 (S311), and, in response, refers to the contents of the table registered in advance to select an application (external application 231 (Application 1) in this example) to be utilized among the available applications. The application selecting unit 122 then stores information about the utilized application as a table, thereby registering the external application 231 (Application 1) as a utilized application. The communication processing unit 121 is then requested to transmit the received operation instruction to the external application 231 (S312, S313).

The processes of subsequent steps S314 through S317 are almost identical to the processes of steps S112 through S116 described with reference to FIG. 9, and a description thereof will be omitted.

In the processes described above, an external application transmits an application availability notice to the application management server 30 when this external application is activated while the power of the MFP 10 is on. Alternatively, the application management server 30 may periodically checks on the MFPs 10 and external servers 20 provided with applications on the network 1 after the power-on of the application management server 30, thereby checking whether applications are available. Based on the results of the check, the application management server 30 may update an application management table stored in the application information storing unit 302.

Figure 28:
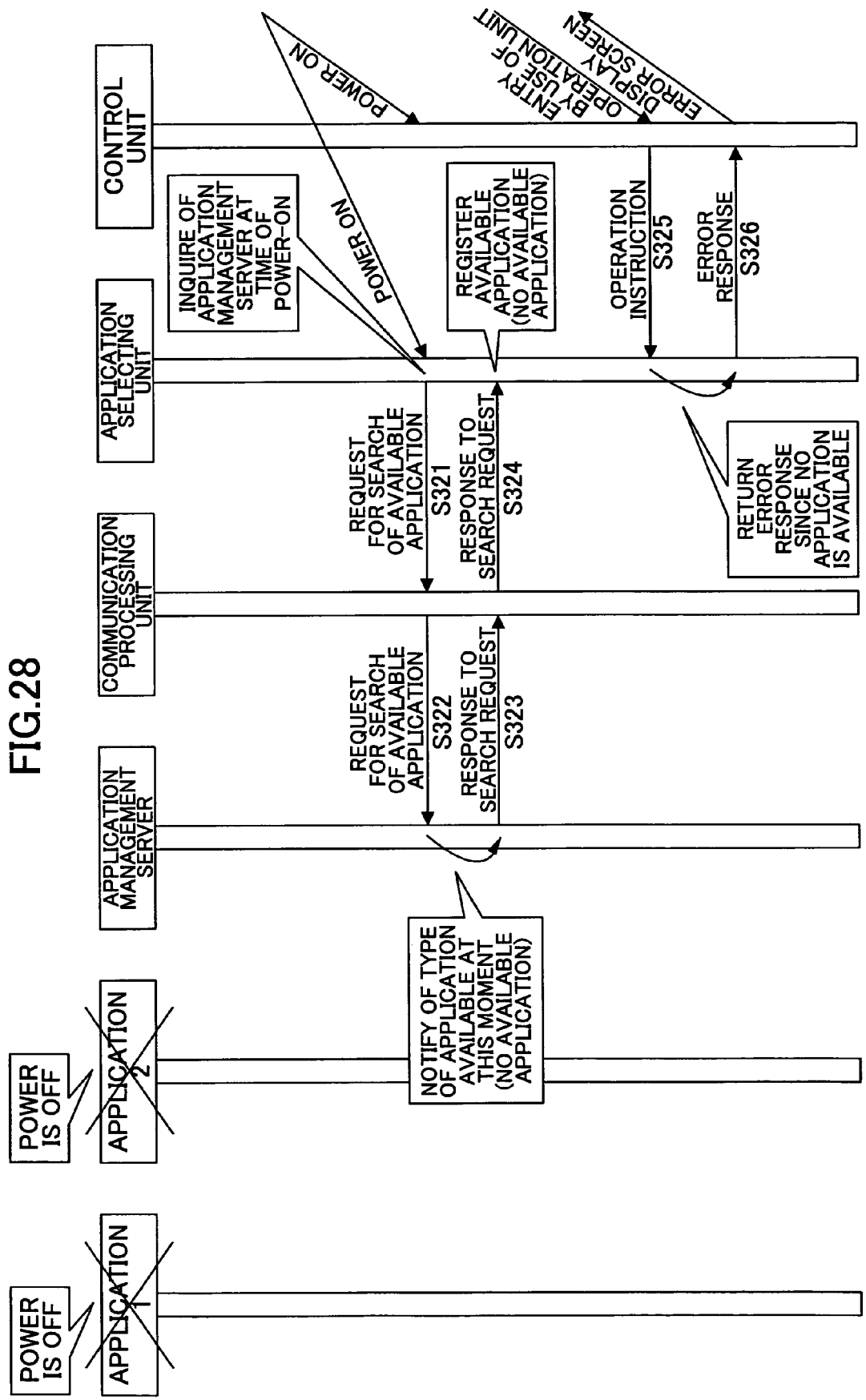
FIG. 28 is a drawing showing a second example of the communication sequence between the MFP, the external applications, and the application management server at the time of power-on or operation instruction of the MFP.

With reference to FIG. 28, a description will be given of a second example of the communication sequence between the MFP 10, the external applications provided in the external servers 20, and the application management server 30 at the time of the power-on or operation instruction of the MFP 10. For the sake of convenience of explanation, the external applications include only the two external applications 231 and 232.

FIG. 28 is a drawing showing a second example of the communication sequence between the MFP 10, the external applications, and the application management server 30 at the time of power-on or operation instruction of the MFP 10.

The application selecting unit 122 of the MFP 10 needs to inquire of the application management server 30 about available applications at the time of power-on. To this end, the application selecting unit 122 transmits a search request (available application search request) to the application management server 30 by use of the communication processing unit 121 (S321, S322).

Upon receiving the available application search request from the MFP 10 via the communication processing unit 301, the control unit 303 of the application management server 30 refers to the application management table of the application information storing unit 302. In this case, no available external applications have yet been registered. The control unit 303 thus transmits a notice indicative of the nonexistence of available external applications to the corresponding MFP 10 as a response (search result response) to the received available application search request (S323).

Upon receiving the search result response from the application management server 30 via the communication processing unit 121, the application selecting unit 122 of the MFP 10 finds that there is no available external application based on the search result response. Thus, no registration of an available external application is performed (S324).

Thereafter, an operation instruction is entered by use of the operation unit 107. The application selecting unit 122 receives this operation instruction via the control unit 124 (S325). Since no available application is registered, an error response is transmitted to the control unit 124 as a response to the received operation instruction.

Upon receiving the error response, the control unit 124 displays an error screen on the operation unit 107 shown in FIG. 3, thereby notifying the user that the function corresponding to the operation instruction entered through the operation unit 107 is not available.

In this seventh example of control, the application selecting unit 122 of the MFP 10 may perform any one of the processes described with reference to FIG. 13 through FIG. 16 (i.e., the processes for determining available applications).

When the processes described in FIG. 13 and FIG. 14 are to be performed, the search result response supplied from the application management server 30 is received through the communication processing unit 121 for registration of available external applications. After this, a user may enter a request to display an application selecting screen through key operations on the operation unit 107. In response to this, a request to acquire information indicative of available application types (type information) is transmitted to the application selecting unit 122.

When the processes described in FIG. 15 are to be performed, the search result response supplied from the application management server 30 is received through the communication processing unit 121 for registration of available external applications. After this, an application selecting screen, which is one of Pattern 1 through Pattern 4 shown in FIG. 15-(*b*) through (*e*), respectively, is displayed on the operation unit 107 based on the registered contents.

When the processes described in FIG. 16 are to be performed, the search result response supplied from the application management server 30 is received through the communication processing unit 121 for registration of available external applications. After this, an application management screen, which is one of Pattern 1 through Pattern 4 shown in FIG. 16-(*b*) through (*e*), respectively, is displayed on the operation unit 107 based on the registered contents.

An application-response-time measuring unit (identical to the application-response-time measuring unit 125 shown in FIG. 22) may be provided in each MFP 10. The application management server 30 transmits a request for acquisition of application response time to each MFP 10, thereby requesting to perform the following processes. As a response to this request, the application management server 30 receives an application response time, thereby obtaining a response performance of each external application.

The application selecting unit 122 of each MFP 10 receives a request for acquisition of application response time via the communication processing unit 121 from the application management server 30. In response, the application selecting unit 122 transmits some sort of notice to the external applications via the communication processing unit 121, and measures a time lapse from the transmission of the notice to the reception of a response to the notice via the communication processing unit 121. Such time measurement is performed with respect to each application. The measured time length obtained for each application (i.e., response time of each application) is transmitted to the application management server 30 as a response to the request for the acquisition of application response time.

The seventh example of control as described above can bring about the same advantages as those described in (1) and (2).

Further, since the application management server 30 registers all the external applications available on the network, it is possible to perform central control of the external applications. This makes it easier to attend to a network failure. Also, a countermeasure can be concentrated on a single location.

Further, the MFP 10 transmits an available application search request to the application management server 30. Upon the receipt of the search request, the application management server 30 transmits to the corresponding MFP 10 a response to the search request based on the contents of the application management table of the application information storing unit 302. The MFP 10 having received the response to the search request registers the contents (indicative of available applications) of the response, and selects an external application to be utilized among the registered applications. This provision makes it possible to perform a desired operation by use of an external application even if a server provided with another application is out of service for some reason. The situation in which the MFP is out of service can thus be avoided.

[Eighth Example of Control]

Figure 29:
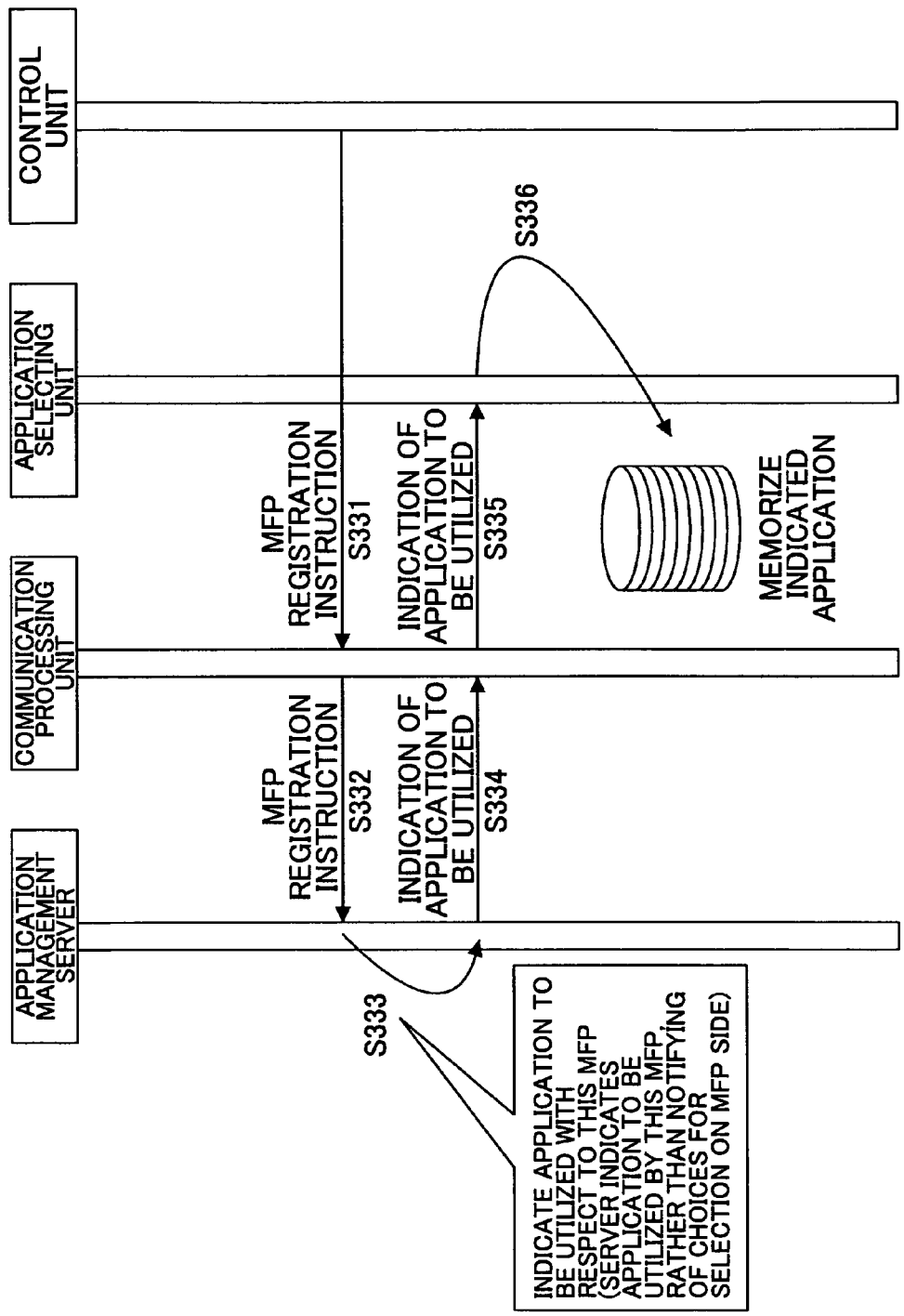
FIG. 29 is a drawing showing a first example of the communication sequence between the MFP and the application management server at the time of instructing to register the MFP at the MFP.

With reference to FIG. 29, a description will be given of a first example of the communication sequence between external applications provided in the external servers 20 and the MFP 10 at the time of instructing to register the MFP at the MFP 10.

FIG. 29 is a drawing showing a first example of the communication sequence between the MFP 10 and the application management server 30 at the time of instructing to register the MFP at the MFP 10.

In the same manner as the processes described in connection with FIG. 27, the control unit 303 of the application management server 30 uses the communication processing unit 301 to receive application availability notices successively from all the external applications inclusive of the external application 231 (Application 1) with which communication is possible through the network 1. Each time the notice is received, the application identification information and type information attached to the notice are used to identify the available external application and its type. The name (application name), type, and IP address of this external application are stored in the application management table of the application information storing unit 302 in such a manner that the stored items are associated with each other, thereby updating the application management table. All the available external applications on the network 1 are thus registered. In so doing, the available external applications are assigned to the MFPs 10 according to predetermined conditions such as those described in the following (a) through (e). Namely, available external applications are determined (selected) with respect to each MFP 10.

(a) Available applications are assigned to the MFPs 10 for which a formal contract has been signed.

(b) Available applications are assigned according to the frequency of use of each external application in order to spread the load. For example, external applications that are not in use are preferentially assigned as available applications.

(c) An external application having the highest response performance with respect to a given MFP 10 is preferentially assigned to this MFP 10 as an available application. In this case, each MFP 10 may be provided with the application-response-time measuring unit, and the application management server 30 transmits a request for acquisition of application response time to each MFP 10. In response to the request, the application management server 30 obtains the application response time to learn the response performance of each external application. The processes of each MFP 10 are the same as those described in connection with the seventh example of control.

(d) An available external application is assigned according to the type of MFP 10 (e.g., high-speed type, low-speed type). For example, the MFP 10 of a high-speed type may be assigned with the application having the highest functionality (high-speed application) as an available application, and the MFP 10 of a low-speed type may be assigned with the application having the lowest functionality (low-speed application) as an available application.

(e) An available external application is assigned according to the installed memory of the MFP 10 (which is specific for each MFP type).

It should be noted that each external application may be provided with a plurality of functions.

The control unit 124 of any MFP 10 receives an MFP registration instruction through the operation unit 107. In response, the control unit 124 uses the communication processing unit 121 to transmit the MFP registration instruction to the application management server 30 as shown in FIG. 29, for example (S331, S332).

The control unit 303 of the application management server 30 receives the MFP registration instruction from the MFP 10 provided on the network 1 through the communication processing unit 301. In order to indicate an application that is to be utilized by the MFP 10, the control unit 303 retrieves the type of the application (e.g., the external application 231) to be utilized by the MFP 10 and the application location information (IP address) indicative of the location of the application from the application management table of the application information storing unit 302 (S333), followed by transmitting the retrieved information to the corresponding MFP 10 as a response (indication of the application to be utilized) to the received MFP registration instruction (S334).

Upon receiving the indication of the application to be utilized from the application management server 30 via the communication processing unit 121, the application selecting unit 122 of the MFP 10 stores the type of the external application to be utilized together with the IP address indicative of its installed location based on the indication of the application to be utilized. Thus, the utilized external application is registered (S335, S336).

Thereafter, an operation instruction (not shown) is entered through the operation unit 107. The application selecting unit 122 receives the operation instruction via the control unit 124, and uses the communication processing unit 121 to transmit the operation instruction to the external application (to be utilized) registered as described above.

Upon receiving the operation instruction from the MFP 10, the external application 231 analyzes the contents of the operation instruction. The external application 231 then transmits a request for execution of a corresponding operation to the corresponding MFP 10 as a response to the received operation instruction.

The application selecting unit 122 of the MFP 10 receives the response to the operation instruction from the external application 231 via the communication processing unit 121. In response, the application selecting unit 122 supplies the response to the operation instruction to the control unit 124.

The control unit 124 performs the operation requested by the response to the operation instruction supplied from the application selecting unit 122.

The eight example of control can bring about the same advantages as described in (1) and (2).

Further, since the application management server 30 registers all the external applications available on the network, it is possible to perform central control of the external applications. This makes it easier to attend to a network failure. Also, a countermeasure can be concentrated on a single location.

Further, the application management server 30 selects an application to be utilized by the MFP 10 among the available external applications, and transmits information indicative of the selected application to the MFP 10. Upon receiving the information, the MFP 10 registers the application to be utilized based on the received information. This provision makes it possible to perform a desired operation by use of an external application even if a server provided with another application is out of service for some reason. The situation in which the MFP is out of service can thus be avoided.

In the second embodiment, if any of the internal applications 131 and 132 are provided in the controller 11 of the MFP 10 as shown by dotted lines in FIG. 25, any of the internal applications may be selected as an application to be utilized, and an operation instruction may be supplied to the internal application. In this manner, the processes identical to those applied to the external applications may also be performed with respect to the internal applications.

Third Embodiment

In the following, a description will be given of an image forming system that is a third embodiment of the electronic apparatus system according to the present invention. The network connection of this image forming system is the same as that shown in FIG. 1.

In the following, an example of the functional configuration of the MFP 10 and the external server 20 will first be described with reference to FIG. 30.

Figure 30:
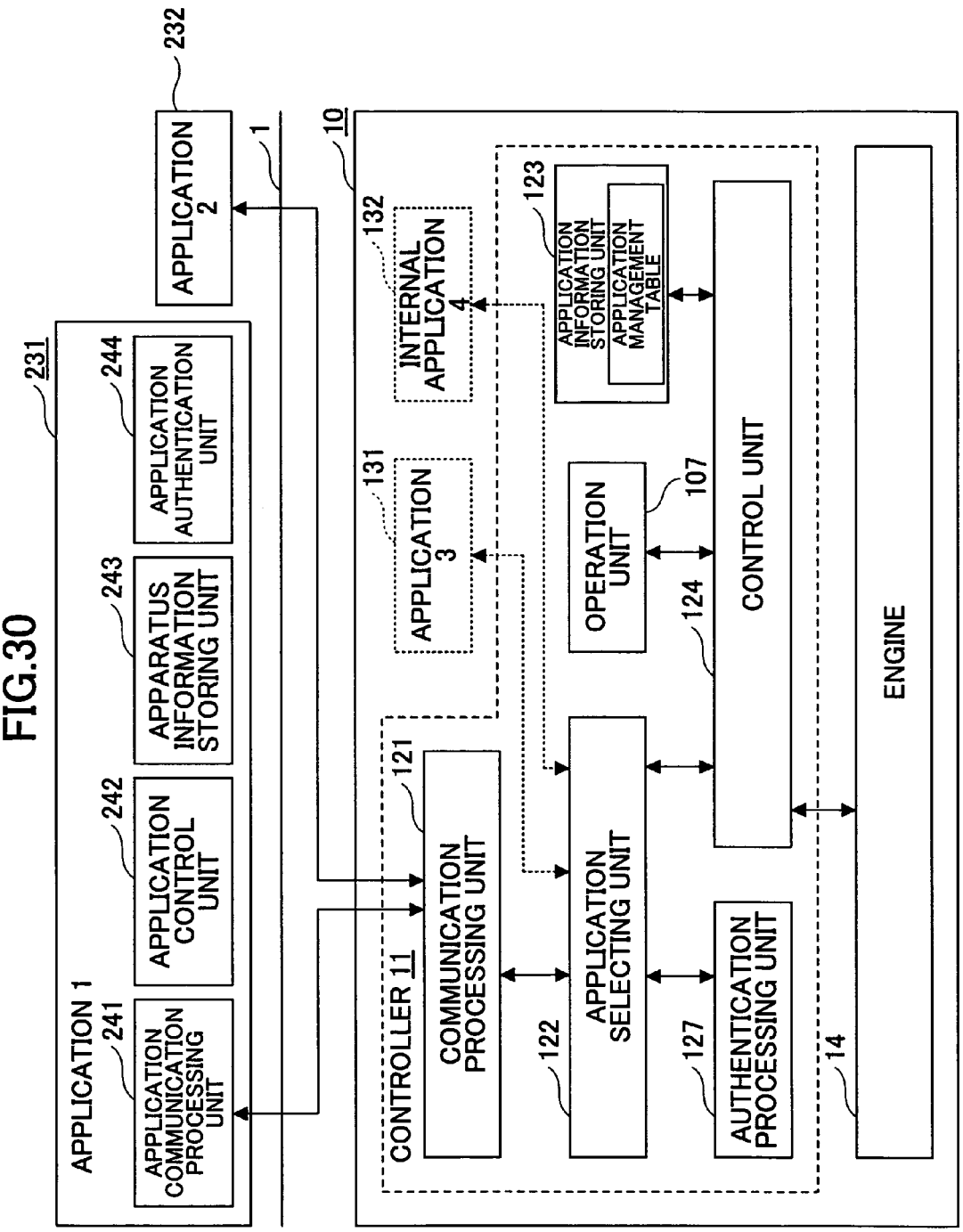
FIG. 30 is a block diagram showing another example of the functional configuration of the MFP and the external server shown in FIG. 1.

FIG. 30 is a block diagram showing another example of the functional configuration of the MFP 10 and the external server 20a shown in FIG. 1. In FIG. 30, the same elements as those of FIG. 6 and FIG. 8 are referred to by the same numerals, and a description thereof may partially be omitted.

The controller 11 of the MFP 10 includes the functions of the communication processing unit 121, the application selecting unit 122, the application information storing unit 123, the control unit 124, and an authentication processing unit 127. These functions are implemented by the CPU 101 shown in FIG. 2 as it operates according the programs stored in the ROM 104 to utilize the SDRAM 103, NVRAM 105, HDD 106, MAC I/F 111, USB I/F 109, and IEEE1394 I/F 110 selectively according to need.

The application selecting unit 122 performs the processes described with reference to FIG. 6, and, in addition, exchanges authentication information with the authentication processing unit 127.

The authentication processing unit 127 performs authentication processes as will later be described.

The external server 20a includes the functions of the application communication processing unit 241, the application control unit 242, the apparatus information storing unit 243, and an application authentication unit 244. These functions are implemented by the CPU 201 shown in FIG. 7 as it operates according the external application 231 stored in the ROM 104 to utilize the USB I/F 209, IEEE1394 I/F 210, and MAC I/F 211 selectively according to need.

The application authentication unit 244 performs the processes as will later be described.

The functional configuration of the external server 20b is substantially identical to that of the external server 20a.

In the following, a description will be given of a control process performed in the image forming system according to the third embodiment of the present invention having the configuration as described above. Namely, a description will be given of a first example of the communication sequence between external applications provided in the external servers 20 and the MFP 10 at the time of the startup of the MFP with reference to FIG. 31 and FIG. 32. For the sake of convenience of explanation, the external applications include only the external applications 231 and 232.

FIG. 31 is a drawing showing a first example of the communication sequence between the external applications 231 and 232 and the MFP 10 at the time of startup of the MFP 10 shown in FIG. 30.

FIG. 32 is a drawing showing a second example of the communication sequence between the external applications 231 and 232 and the MFP 10 at the time of startup of the MFP 10 shown in FIG. 30.

At the time of the startup (power-on), the application selecting unit 122 of the MFP 10 issues a startup notice (MFP startup notice) to the external applications 231 and 232 that are already registered (as indicated by the information stored in the application management table of the application information storing unit 123 shown in FIG. 30). Namely, the communication processing unit 121 is requested to transmit an MFP startup notice to the external applications 231 and 232 (Application 1 and Application 2) successively (S101 through S104). The MFP startup notice directed to the external applications 231 and 232 includes an application identification number indicative of the external applications 231 and 232, respectively. This application identification number is acquired from the application information storing unit 123 shown in FIG. 30 together with the information about the location of the site of the application.

If the external server 20a having the external application 231 is running, the external application 231 receives the MFP startup notice from the MFP 10, and, in response to the notice, transmits an application availability notice (Application-1 availability notice) inclusive of its identification information and specific authentication information (e.g., key information for use in encryption) to the corresponding MFP 10 (i.e., the MFP 10 that transmitted the MFP startup notice) (S105).

If the external server 20b having the external application 232 is running, the external application 232 receives the MFP startup notice from the MFP 10, and, in response to the notice, transmits an application availability notice (Application-2 availability notice) inclusive of its identification information and specific authentication information to the MFP 10 (S107).

The application selecting unit 122 of the MFP 10 receives via the communication processing unit 121 the application-1 availability notice from the external application 231 and the application-2 availability notice from the external application 232. The application selecting unit 122 determines whether the external applications 231 and 232 are available or not based on the application identification information attached to the notices. In this example, the external applications 231 and 232 are both available, so that the application management table of the application information storing unit 123 is accessed to set the corresponding "available/unavailable" status therein to "available". That is, the external applications 231 and 232 are registered as available applications (S106, S108). In so doing, the authentication information attached to the received application-1 availability notice and the received application-2 availability notice is also stored. The authentication information together with the identification information indicative of the external applications 231 and 232 are transmitted to the authentication processing unit 127 (S401, 402).

Upon receiving the authentication information together with the identification information indicative of the external applications 231 and 232 from the application selecting unit 122, the authentication processing unit 127 stores the authentication information and the identification information indicative of the external applications 231 and 232 in such a manner that they are associated with each other.

Thereafter, an operation instruction is entered by use of the operation unit 107. The application selecting unit 122 receives this operation instruction via the control unit 124 (S411), and, in response, accesses the contents of the application management table of the application information storing unit 123 to select (determine) an application (the external application 231 (Application 1) in this example) to be utilized (used) among the available applications. The application selecting unit 122 then stores information about the selected application as a utilized application management table in the application information storing unit 123. The external application 231 (Application 1) is thus registered as a utilized application. A request for acquisition of the authentication information of the external application 231 together with the identification information indicative of the external application 231 are then transmitted to the authentication processing unit 127 (S412).

Upon receiving the request for acquisition of the authentication information together with the identification information indicative of the external application 231 from the application selecting unit 122, the authentication processing unit 127 sends the authentication information stored in memory associated with the received identification information to the application selecting unit 122.

Upon receiving the authentication information from the authentication processing unit 127, the application selecting unit 122 uses the communication processing unit 121 to transmit the received operation instruction with the attached authentication information (S414, S415).

Upon receiving the operation instruction from the MFP 10, the external application 231 performs an authentication process to check the authenticity of the operation instruction. Namely, the application authentication unit 244 analyzes the authentication information attached to the operation instruction to check whether this authentication information matches the authentication information that was sent to the MFP 10 from which the operation instruction has been supplied. If authentication is successful, i.e., if the authentication information attached to the received operation instruction matches the authentication information that was sent to the MFP 10 from which the operation instruction has been supplied, the contents of the operation instruction are analyzed (S416). A request (command) for execution of a corresponding operation is then to the corresponding MFP 10 (i.e., the MFP 10 that transmitted the operation instruction) as a response to the received operation instruction (S417).

The application selecting unit 122 of the MFP 10 receives the response (execution request) to the operation instruction from the external application 231 via the communication processing unit 121. In response, the application selecting unit 122 supplies the response to the operation instruction to the control unit 124 (S418, S419).

Upon receiving the response to the operation instruction from the application selecting unit 122, the control unit 124 performs the operation requested by the response to the operation instruction (execution request).

If authentication fails, i.e., if the authentication information attached to the received operation instruction does not match the authentication information that was sent to the MFP 10 from which the operation instruction has been supplied, the external application 231 refuses to analyze the contents of the operation instruction (S416'). The external application 231 further transmits a response indicative of operation unavailability to the corresponding MFP 10 (i.e., the MFP 10 that transmitted the operation instruction) (S417').

The application selecting unit 122 of the MFP 10 receives the response indicative of operation unavailability from the external application 231 via the communication processing unit 121. In response, the application selecting unit 122 supplies the response indicative of operation unavailability to the control unit 124 (S418', S419').

In the processes described above, the MFP 10 transmits the MFP startup notices to the external applications at the time of power-on of the MFP 10. Alternatively, these notices may be transmitted at other timing (e.g., may be transmitted upon an instruction entered through a key operation on the operation unit 107). Alternatively, when an external application is activated while the power of the MFPs 10 is on, this external application may identify an MFP 10, and may transmit its own application availability notice to the identified MFP 10.

The authentication processes performed by the MFP 10 and the external applications as described above may as well be performed at the time of other communications in addition to at the time of communications between the MFP 10 and the external applications 231 and 232 described with reference to FIG. 31 and FIG. 32.

This third embodiment can bring about the same advantages as those of the first embodiment. Further, since the MFP 10 and the external applications perform authentication processes at the time of communication with each other, security can be enhanced.

These embodiments have been described with reference to the configuration in which the present invention is applied to an image forming system (electronic apparatus system) including the MFPs (digital multifunction peripherals) equipped with communication functions and the external apparatuses (external servers and application management server) connected to each other for communication. The present invention is not limited to such configuration, and is equally applicable to an image processing system in which image processing apparatuses equipped with communication functions and external apparatuses are connected to each other for communication, such image processing apparatuses including image scanning apparatuses like scanners, digital copiers, printers, facsimile apparatuses, etc. The present invention is as well application to an electronic apparatus system in which electronic apparatuses and external servers are connected to each other for communication, such electronic apparatuses including network electric household appliances equipped with communication functions, vending machines, medical devices, power supply devices, air-conditioning systems, meter systems for metering gas, water, electricity, and so on, AV appliances, entertainment apparatuses, etc.

Further, the program according to the present invention serves to cause the computer (CPU) of an electronic apparatus such as an image processing apparatus to implement the functions of the application registering unit, the application selecting unit, and the control unit. Such program is performed by the computer to achieve the advantages as described above.

This program may be stored in the memory storage such as a ROM or HDD that is preinstalled in the computer. Alternatively, the program may be recorded in and provided through a record medium such as a CD-ROM or a flexible disk or a nonvolatile record medium (memory) such as an SRAM, an EEPROM, or a memory card. The program recorded in such memory storage is installed to the computer for execution by the CPU. Alternatively, the CPU loads the program from this memory storage for execution, thereby performing the steps as described above.

Further, such program may be downloaded from an external apparatus having a record medium with the program recorded therein, or may be downloaded from an external apparatus having a memory unit in which the program is recorded.

The present invention is applicable to an electronic apparatus system which includes electronic apparatuses such as image processing apparatuses (image scanning apparatuses such as scanners and image forming apparatuses such as digital copiers, printers, facsimile apparatuses, digital multifunction peripherals, etc.), the computers of such electronic apparatuses, and external applications connected to the electronic apparatuses via communication links.

Further, the present invention is not limited to these embodiments, but various variations and modifications may be made without departing from the scope of the present invention.

The present application is based on Japanese priority application No. 2004-272225 filed on Sep. 17, 2004 and Japanese priority application No. 2005-253027 filed on Sep. 1, 2005, with the Japanese Patent Office, the entire contents of which are hereby incorporated by reference.

What is claimed is:

1. An electronic apparatus system comprising:
a plurality of external apparatuses connected to an electronic apparatus via a communication link,
at least one of the external apparatuses serving as an application server including
an application storing unit configured to store an application, and
a controlling unit configured to analyze contents of an operation instruction using the application stored in said application storing unit upon receiving the operation instruction from said electronic apparatus, and to transmit a request to execute a corresponding operation to said electronic apparatus as a response to the operation instruction, and
at least one of the external apparatuses serving as an application management server including
an application managing unit configured to manage a plurality of applications,
a first application registering unit configured to register at least one application installed in said plurality of external apparatuses as available applications according to management status of said application managing unit,
an application selecting unit configured to select an application to be utilized from the at least one application registered by said application registering unit, and
an application information transmitting unit configured to transmit information identifying a utilized application selected by said application selecting unit to said electronic apparatus;

the electronic apparatus being configured to perform an operation using an application, the electronic apparatus including
- a second application registering unit configured to register the utilized application based on said information transmitted from said application information transmitting unit,
- a control unit configured to transmit an operation instruction to one of the external apparatuses having the utilized application registered therein in response to an entry of the operation instruction, and to perform the operation requested by a request to execute the operation upon receiving the request to execute the operation as a response to the transmitted operation instruction, and
- an operation unit configured to display a list of registered applications of the applications installed in the plurality of external apparatuses, the registered applications being available to be utilized by the control unit.

2. The electronic apparatus system as claimed in claim 1, wherein said first application registering unit includes an application determining unit configured to select available applications according to a predetermined condition.

3. The electronic apparatus system as claimed in claim 2, wherein said application determining unit selects an application having a highest response performance as an available application.

4. The electronic apparatus system as claimed in claim 2, wherein said application determining unit selects an application having a highest functionality as an available application.

5. The electronic apparatus system as claimed in claim 2, wherein said application determining unit selects an application having a lowest functionality as an available application.

6. The electronic apparatus system as claimed in claim 2, wherein said application determining unit selects the available applications according to frequency of use of applications installed in the plurality of external apparatuses.

7. The electronic apparatus system as claimed in claim 2, wherein said application determining unit selects available applications according to an installed memory of said electronic apparatus.

8. An electronic apparatus which performs an operation using an application and communicates with a plurality of external apparatuses, comprising:
- an application registering unit configured to register at least one application selected as an available application from applications installed in the plurality of external apparatuses;
- an application selecting unit configured to select an application to be utilized from the at least one application registered by said application registering unit;
- a control unit configured to communicate with an external apparatus having a selected application installed therein and to perform the operation utilizing said selected application installed in said external apparatus; and
- an operation unit configured to display a list of registered applications of the applications installed in the plurality of external apparatuses, the registered applications being available to be utilized by the control unit.

9. The electronic apparatus as claimed in claim 8, wherein said application registering unit includes an application determining unit configured to select available applications according to a predetermined condition.

10. The electronic apparatus as claimed in claim 9, wherein said application determining unit selects an application having a highest response performance as an available application.

11. The electronic apparatus as claimed in claim 9, wherein said application determining unit selects an application having a highest functionality as an available application.

12. The electronic apparatus as claimed in claim 9, wherein said application determining unit selects an application having a lowest functionality as an available application.

13. The electronic apparatus as claimed in claim 9, wherein said application determining unit selects available applications according to frequency of use of the applications installed in the plurality of external apparatuses.

14. The electronic apparatus as claimed in claim 8, wherein said application registering unit includes an application determining unit configured to select available applications according to an operation on an operation unit.

15. The electronic apparatus as claimed in claim 8, wherein
- said application registering unit registers an application with authentication information in response to an application availability notice supplied from one of the external apparatuses, the application availability notice including the authentication information, and
- said control unit transmits an operation instruction and the authentication information to one of the plurality of external apparatuses in response to an entry of the operation instruction, and performs an operation requested by a request to execute the operation upon receiving the request to execute the operation as a response to the transmitted operation instruction.

16. An electronic apparatus system comprising:
- a plurality of external apparatuses connected to an electronic apparatus via a communication link,
- at least one of the external apparatuses serving as an application server including
  - an application storing unit configured to store an application, and
  - a controlling unit configured to analyze contents of an operation instruction using the application stored in said application storing unit upon receiving the operation instruction from said electronic apparatus, and to transmit a request to execute a corresponding operation to said electronic apparatus as a response to the operation instruction, and
- at least one of the external apparatuses serving as an application management server including
  - an application managing unit configured to manage a plurality of applications,
  - a first application registering unit configured to register at least one application installed in said plurality of external apparatuses as available applications according to management status of said application managing unit, and
  - an application information transmitting unit configured to transmit information identifying at least one application registered by said first application registering unit to said electronic apparatus;
- the electronic apparatus configured to perform an operation using an application, the electronic apparatus including
  - a second application registering unit configured to register at least one application based on said information transmitted from said application information transmitting unit,
  - an application selecting unit configured to select an application to be utilized from the at least one application registered by said second application registering unit,
  - a control unit configured to transmit an operation instruction to one of the external apparatuses having the application selected by said application selecting unit in response to an entry of the operation instruction, and to perform the operation requested by a request to execute the operation upon receiving the request to execute the operation as a response to the transmitted operation instruction, and an operation unit configured to display a list of registered applications of the applications installed in the plurality of external apparatuses, the registered applications being available to be utilized by the control unit.

17. The electronic apparatus system as claimed in claim 16, wherein said second application registering unit includes an application determining unit configured to select available applications according to a predetermined condition.

18. The electronic apparatus system as claimed in claim 17, wherein said application determining unit selects an application having a highest response performance as an available application.

19. The electronic apparatus system as claimed in claim 17, wherein said application determining unit selects an application having a highest functionality as an available application.

20. The electronic apparatus system as claimed in claim 17, wherein said application determining unit selects an application having a lowest functionality as an available application.

21. The electronic apparatus system as claimed in claim 17, wherein said application determining unit selects the available applications according to frequency of use of the applications installed in the plurality of external apparatuses.

22. The electronic apparatus system as claimed in claim 16, wherein said second application registering unit includes an application determining unit configured to select available applications according to an operation on an operation unit.

23. A non-transitory computer-readable medium having stored thereon computer-readable instructions that when executed by a computer cause the computer to perform a method using an application communicating with a plurality of external apparatuses, the method comprising:

registering at least one application selected as an available application from applications installed in the plurality of external apparatuses;

selecting an application to be utilized from the registered at least one application;

communicating with an external apparatus having a selected application installed therein and performing the operation utilizing said selected application installed in said external apparatus; and displaying a list of registered applications of the applications installed in the plurality of external apparatuses, the registered applications being available to be utilized.

24. The computer-readable medium as claimed in claim 23, further comprising:

selecting available applications according to a predetermined condition.

25. The computer-readable medium as claimed in claim 24, further comprising:

selecting an application having a highest response performance as an available application.

26. The computer-readable medium as claimed in claim 24, further comprising:

selecting an application having a highest functionality as an available application.

27. The computer-readable medium as claimed in claim 24, further comprising:

selecting an application having a lowest functionality as an available application.

28. The computer-readable medium as claimed in claim 23, further comprising:

selecting available applications according to an operation on an operation function unit.

29. The computer-readable medium as claimed in claim 23, further comprising:

registering an application with authentication information in response to an application availability notice supplied from one of the external apparatuses, the application availability notice including the authentication information, transmitting an operation instruction and the authentication information to one of the plurality of external apparatuses in response to an entry of the operation instruction, and performing the operation requested by a request to execute the operation upon receiving the request to execute the operation as a response to the transmitted operation instruction.

30. A method of controlling an electronic apparatus that performs an operation using an application, comprising:

registering, using the electronic apparatus at an application registering unit, at least one application selected as an available application from applications installed in a plurality of external apparatuses, said electronic apparatus being connected to the plurality of external apparatuses through a communication link;

selecting, using the electronic apparatus at an application selecting unit, an application to be utilized from the at least one application registered by the application registering unit;

communicating, using the electronic apparatus at a control unit, with an external apparatus having a selected application installed therein and performing the operation by utilizing the selected application installed in said external apparatus; and displaying, using the electronic apparatus at an operation unit, a list of registered applications of the applications installed in the plurality of external apparatuses, the registered applications being available to be utilized by the control unit.

31. The method as claimed in claim 30, wherein the application registering unit selects available applications according to a predetermined condition.

32. The method as claimed in claim 31, wherein the application registering unit selects an application having a highest response performance as an available application.

33. The method as claimed in claim 31, wherein the application registering unit selects an application having a highest functionality as an available application.

34. The method as claimed in claim 31, wherein the application registering unit selects an application having a lowest functionality as an available application.

35. The method as claimed in claim 30, wherein the application registering unit selects the available applications according to an operation on an operation unit.

36. The method as claimed in claim 30, wherein the application registering unit registers an application with authentication information in response to an application availability notice supplied from one of the external apparatuses, the application availability notice including the authentication information, and the control unit transmits an operation instruction and the authentication information to one of the plurality of external apparatuses in response to an entry of the operation instruction, and performs an operation requested by a request to execute the operation upon receiving the request to execute the operation as a response to the transmitted operation instruction.

37. An electronic apparatus system comprising:
an electronic apparatus which communicates and is connected with a plurality of external apparatuses via a communication link, including
- an application registering unit configured to register at least one application selected as an available application from applications installed in the plurality of external apparatuses,
- an application selecting unit configured to select an application-to be utilized from the at least one application registered by said application registering unit,
- a control unit configured to communicate with an external apparatus having a selected application installed therein and to perform the operation utilizing said selected application installed in said external apparatus, and
- an operation unit configured to display a list of registered applications of the applications installed in the plurality of external apparatuses, the registered applications being available to be utilized by the control unit; and an external apparatuses of the plurality of external apparatuses, including
- an application storing unit configured to store an application, and
- a controlling unit configured to
  - analyze contents of an operation instruction using the application stored in said application storing unit upon receiving the operation instruction from said electronic apparatus, and
  - transmit a request to execute a corresponding operation to said electronic apparatus in response to the operation instruction, wherein
said control unit transmits the operation instruction to one of the external apparatuses in response to an entry of the operation instruction and performs the operation requested by the request to execute a corresponding operation upon receiving the request to execute the corresponding operation in response to the transmitted operation instruction.

38. The electronic apparatus system as claimed in claim 37, further comprising:
an authentication unit configured to perform an authentication process which checks authenticity of the operation instruction upon receiving the operation instruction from said electronic apparatus, wherein
said controlling unit transmits the request to execute the corresponding operation to said electronic apparatus in response to a confirmation of authenticity of the operation instruction by said authentication unit, said application registering unit registers an application together with authentication information in response to an application availability notice supplied from one of the external apparatuses, the application availability notice including the authentication information, and said control unit transmits the operation instruction with the authentication information in response to an entry of the operation instruction.

* * * * *